US010860611B2

(12) United States Patent
Spiegelman et al.

(10) Patent No.: US 10,860,611 B2
(45) Date of Patent: *Dec. 8, 2020

(54) METHOD FOR SHARING AND SEARCHING PLAYLISTS

(71) Applicant: HUAWEI TECHNOLOGIES CO., LTD., Shenzhen (CN)

(72) Inventors: Michael Spiegelman, Los Angeles, CA (US); David E. Brown, Boston, MA (US); Lori Ann Sutton, La Jolla, CA (US); Pierre Schiro, Culver City, CA (US); Christa Maria Stelzmuller, Long Beach, CA (US); Siddhartha S. Sahay, Rolling Hills, CA (US); Daniel Baird, Carlsbad, CA (US); Adam Korman, Aliso Viejo, CA (US); Alexander Stephen Toth, Venice, CA (US); Poorna Chandra Gowda Bannikuppe Ramachandra, Bangalore (IN); Bipin Suresh, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

This patent is subject to a terminal disclaimer.

(21) Appl. No.: 15/890,611

(22) Filed: Feb. 7, 2018

(65) Prior Publication Data

US 2018/0165342 A1 Jun. 14, 2018

Related U.S. Application Data

(63) Continuation of application No. 15/072,190, filed on Mar. 16, 2016, now Pat. No. 10,019,500, which is a
(Continued)

(51) Int. Cl.
*G06F 16/00* (2019.01)
*G06F 16/27* (2019.01)
(Continued)

(52) U.S. Cl.
CPC ........ *G06F 16/273* (2019.01); *G06F 16/3344* (2019.01); *G06F 16/4387* (2019.01);
(Continued)

(58) Field of Classification Search
CPC .. G06F 16/639; G06F 16/438; G06F 16/9535; G06F 16/4393; G06F 2221/2113;
(Continued)

(56) References Cited

U.S. PATENT DOCUMENTS

| 253,743 A | 2/1882 | Mensing |
|---|---|---|
| 1,235,999 A | 8/1917 | Neeley |

(Continued)

FOREIGN PATENT DOCUMENTS

| EP | 1176840 A1 | 1/2002 |
|---|---|---|
| EP | 1489800 A1 | 12/2004 |

(Continued)

OTHER PUBLICATIONS

Lienhart, Rainer, et al., "Improving Media Services on P2P Networks", IEEE Internet Computing, Jan.-Feb. 2002, pp. 73-77.
(Continued)

*Primary Examiner* — Anh Ly
(74) *Attorney, Agent, or Firm* — Conley Rose, P.C.

(57) ABSTRACT

The present disclosure provides a method for making a playlist available to the public. In another embodiment, the present disclosure provides a method for creating a playlist comprising user-defined descriptor information. In another embodiment, the present disclosure provides a method for searching for such public playlists.

20 Claims, 13 Drawing Sheets

Related U.S. Application Data continuation of application No. 14/635,720, filed on Mar. 2, 2015, now abandoned, which is a continuation of application No. 13/679,711, filed on Nov. 16, 2012, now Pat. No. 9,002,879, which is a continuation of application No. 11/315,419, filed on Dec. 21, 2005, now Pat. No. 8,346,798.

(60) Provisional application No. 60/678,718, filed on May 5, 2005, provisional application No. 60/657,222, filed on Feb. 28, 2005.

(51) Int. Cl.

| | | |
|---|---|---|
| *H04L 29/06* | (2006.01) | |
| *G06F 16/635* | (2019.01) | |
| *G06F 16/638* | (2019.01) | |
| *G06F 16/33* | (2019.01) | |
| *G06F 16/438* | (2019.01) | |
| *G06F 16/9535* | (2019.01) | |
| *G06F 21/10* | (2013.01) | |
| *G06F 21/62* | (2013.01) | |
| *G06Q 10/10* | (2012.01) | |
| *G06Q 20/12* | (2012.01) | |
| *G06Q 30/02* | (2012.01) | |
| *G06Q 30/06* | (2012.01) | |
| *G11B 27/10* | (2006.01) | |
| *G11B 27/34* | (2006.01) | |
| *H04L 12/18* | (2006.01) | |
| *H04L 12/58* | (2006.01) | |
| *H04N 7/173* | (2011.01) | |
| *H04N 21/254* | (2011.01) | |
| *H04N 21/41* | (2011.01) | |
| *H04N 21/414* | (2011.01) | |
| *H04N 21/433* | (2011.01) | |
| *H04N 21/462* | (2011.01) | |
| *H04N 21/4627* | (2011.01) | |
| *H04N 21/472* | (2011.01) | |
| *H04N 21/4788* | (2011.01) | |
| *H04N 21/482* | (2011.01) | |
| *H04N 21/658* | (2011.01) | |
| *H04N 21/81* | (2011.01) | |
| *H04N 21/8355* | (2011.01) | |
| *H04L 29/08* | (2006.01) | |
| *G11B 20/00* | (2006.01) | |

(52) U.S. Cl.
CPC ........ *G06F 16/4393* (2019.01); *G06F 16/637* (2019.01); *G06F 16/639* (2019.01); *G06F 16/9535* (2019.01); *G06F 21/10* (2013.01); *G06F 21/6236* (2013.01); *G06Q 10/10* (2013.01); *G06Q 20/1235* (2013.01); *G06Q 30/02* (2013.01); *G06Q 30/06* (2013.01); *G11B 27/105* (2013.01); *G11B 27/34* (2013.01); *H04L 12/1822* (2013.01); *H04L 29/06027* (2013.01); *H04L 51/04* (2013.01); *H04L 63/0263* (2013.01); *H04L 63/101* (2013.01); *H04L 63/105* (2013.01); *H04L 65/4084* (2013.01); *H04L 67/06* (2013.01); *H04L 67/22* (2013.01); *H04L 67/306* (2013.01); *H04L 67/325* (2013.01); *H04L 67/327* (2013.01); *H04L 67/34* (2013.01); *H04N 7/17318* (2013.01); *H04N 21/2541* (2013.01); *H04N 21/4126* (2013.01); *H04N 21/41407* (2013.01); *H04N 21/4331* (2013.01); *H04N 21/4622* (2013.01); *H04N 21/4627* (2013.01); *H04N 21/4788* (2013.01); *H04N 21/47214* (2013.01); *H04N 21/4825* (2013.01); *H04N 21/658* (2013.01); *H04N 21/8113* (2013.01); *H04N 21/8355* (2013.01); *G06F 2213/0038* (2013.01); *G06F 2216/01* (2013.01); *G06F 2221/2113* (2013.01); *G06F 2221/2137* (2013.01); *G11B 20/00086* (2013.01); *H04L 2463/101* (2013.01); *Y10S 707/913* (2013.01)

(58) Field of Classification Search
CPC . H04L 67/306; H04L 63/101; G06Q 20/1235; H04N 21/4825; H04N 21/8113
See application file for complete search history.

(56) References Cited

U.S. PATENT DOCUMENTS

| | | | |
|---|---|---|---|
| 1,877,241 | A | 9/1932 | Hultman |
| 2,040,010 | A | 5/1936 | McMahon |
| 3,540,111 | A | 11/1970 | Wainwright |
| 3,688,086 | A | 8/1972 | Levasseur |
| 4,484,430 | A | 11/1984 | Rossman |
| 4,890,925 | A | 1/1990 | Kitamori et al. |
| 5,055,265 | A | 10/1991 | Finlan |
| 5,124,207 | A | 6/1992 | Hayashi et al. |
| 5,205,101 | A | 4/1993 | Swan et al. |
| 5,493,677 | A | 2/1996 | Balogh et al. |
| 5,566,353 | A | 10/1996 | Cho et al. |
| 5,616,876 | A | 4/1997 | Cluts |
| 5,623,786 | A | 4/1997 | DeMeyer |
| 5,729,741 | A | 3/1998 | Liaguno et al. |
| 5,748,956 | A | 5/1998 | Lafer et al. |
| 5,796,945 | A | 8/1998 | Tarabella |
| 5,832,501 | A | 11/1998 | Kain, III et al. |
| 5,862,325 | A | 1/1999 | Reed et al. |
| 5,864,870 | A | 1/1999 | Guck |
| 5,886,698 | A | 3/1999 | Sciammarella et al. |
| 5,890,152 | A | 3/1999 | Rapaport et al. |
| 5,892,535 | A | 4/1999 | Allen et al. |
| 5,903,892 | A | 5/1999 | Hoffert et al. |
| 5,911,776 | A | 6/1999 | Guck |
| 5,915,019 | A | 6/1999 | Ginter et al. |
| 5,928,330 | A | 7/1999 | Goetz et al. |
| 5,950,173 | A | 9/1999 | Perkowski |
| 5,964,068 | A | 10/1999 | O'Neill |
| 5,982,369 | A | 11/1999 | Sciammarella et al. |
| 5,983,236 | A | 11/1999 | Yager et al. |
| 5,996,015 | A | 11/1999 | Day et al. |
| 6,006,241 | A | 12/1999 | Purnaveja et al. |
| 6,012,068 | A | 1/2000 | Boezeman et al. |
| 6,064,380 | A | 5/2000 | Swenson et al. |
| 6,065,267 | A | 5/2000 | Fisher |
| 6,073,727 | A | 6/2000 | DiFranza et al. |
| 6,115,988 | A | 9/2000 | Reisdorff |
| 6,118,450 | A | 9/2000 | Proehl et al. |
| 6,138,119 | A | 10/2000 | Hall et al. |
| 6,157,377 | A | 12/2000 | Shah-Nazaroff et al. |
| 6,192,340 | B1 | 2/2001 | Abecassis |
| 6,210,715 | B1 | 4/2001 | Starling et al. |
| 6,226,672 | B1 | 5/2001 | DeMartin et al. |
| 6,232,539 | B1 * | 5/2001 | Looney ............... G10H 1/0041 434/307 A |
| 6,248,946 | B1 | 6/2001 | Dwek |
| 6,256,623 | B1 | 7/2001 | Jones |
| 6,292,775 | B1 | 9/2001 | Holmes |
| 6,308,204 | B1 | 10/2001 | Nathan et al. |
| 6,342,396 | B1 | 1/2002 | Perrin et al. |
| 6,356,971 | B1 | 3/2002 | Katz et al. |
| 6,389,467 | B1 | 5/2002 | Eyal |
| 6,393,430 | B1 | 5/2002 | Van Ryzin |
| 6,421,726 | B1 | 7/2002 | Kenner et al. |
| 6,427,140 | B1 | 7/2002 | Ginter et al. |
| 6,446,080 | B1 | 9/2002 | Van Ryzin et al. |
| 6,466,918 | B1 | 10/2002 | Spiegel et al. |
| 6,477,704 | B1 | 11/2002 | Cremia |
| 6,484,157 | B1 | 11/2002 | Chowdhury et al. |

(56) References Cited

U.S. PATENT DOCUMENTS

| | | | |
|---|---|---|---|
| 6,484,199 B2 | 11/2002 | Eyal et al. |
| 6,526,411 B1 | 2/2003 | Ward |
| 6,529,835 B1 | 3/2003 | Wada et al. |
| 6,530,944 B2 | 3/2003 | West et al. |
| 6,538,665 B2 | 3/2003 | Crow et al. |
| 6,545,209 B1 | 4/2003 | Flannery et al. |
| 6,549,922 B1 | 4/2003 | Srivastava et al. |
| 6,574,609 B1 | 6/2003 | Downs et al. |
| 6,587,127 B1 * | 7/2003 | Leeke | G06F 3/165 |
| | | | 715/765 |
| 6,587,837 B1 | 7/2003 | Spagna et al. |
| 6,605,770 B2 | 8/2003 | Yamane et al. |
| 6,609,096 B1 | 8/2003 | De Bonet et al. |
| 6,609,105 B2 | 8/2003 | Van Zoest et al. |
| 6,609,253 B1 * | 8/2003 | Swix | G11B 27/005 |
| | | | 348/E7.073 |
| 6,612,231 B2 * | 9/2003 | Shimizu | B41F 15/44 |
| | | | 101/114 |
| 6,618,144 B1 | 9/2003 | Reed |
| 6,654,367 B1 | 11/2003 | Kaufman |
| 6,657,116 B1 | 12/2003 | Gunnerson |
| 6,662,231 B1 | 12/2003 | Drosset et al. |
| 6,686,970 B1 | 2/2004 | Windle |
| 6,691,162 B1 | 2/2004 | Wick |
| 6,699,724 B1 | 3/2004 | West et al. |
| 6,708,154 B2 | 3/2004 | Acero |
| 6,710,366 B1 | 3/2004 | Lee et al. |
| 6,712,051 B1 | 3/2004 | Lakin |
| 6,718,308 B1 | 4/2004 | Nolting |
| 6,721,489 B1 | 4/2004 | Benyamin et al. |
| 6,728,729 B1 | 4/2004 | Jawa et al. |
| 6,731,312 B2 | 5/2004 | Robbin |
| 6,735,628 B2 | 5/2004 | Eyal et al. |
| 6,738,766 B2 | 5/2004 | Peng |
| 6,748,395 B1 | 6/2004 | Picker et al. |
| 6,760,042 B2 | 7/2004 | Zetts |
| 6,760,721 B1 | 7/2004 | Chasen et al. |
| 6,763,345 B1 | 7/2004 | Hempleman et al. |
| 6,772,212 B1 | 8/2004 | Lau et al. |
| 6,816,944 B2 | 11/2004 | Peng |
| 6,820,238 B1 | 11/2004 | Auflick et al. |
| 6,829,033 B2 | 12/2004 | Hose et al. |
| 6,850,256 B2 | 2/2005 | Crow et al. |
| 6,859,838 B1 | 2/2005 | Puranik et al. |
| 6,892,196 B1 | 5/2005 | Hughes |
| 6,922,759 B1 | 7/2005 | Garritsen |
| 6,928,419 B2 | 8/2005 | Stefik et al. |
| 6,928,423 B1 | 8/2005 | Yamanaka |
| 6,928,433 B2 | 8/2005 | Goodman et al. |
| 6,933,433 B1 | 8/2005 | Porteus et al. |
| 6,941,324 B2 | 9/2005 | Plastina et al. |
| 6,943,324 B2 | 9/2005 | Ahuja |
| 6,944,612 B2 | 9/2005 | Roustant et al. |
| 6,968,179 B1 | 11/2005 | De Vries |
| 6,972,363 B2 | 12/2005 | Georges et al. |
| 6,987,221 B2 | 1/2006 | Platt |
| 7,007,438 B1 | 3/2006 | Shields et al. |
| 7,013,290 B2 * | 3/2006 | Ananian | G06Q 30/02 |
| | | | 705/26.42 |
| 7,020,704 B1 | 3/2006 | Lipscomb et al. |
| 7,024,424 B1 | 4/2006 | Platt et al. |
| 7,043,477 B2 | 5/2006 | Mercer et al. |
| 7,047,406 B2 | 5/2006 | Schleicher et al. |
| 7,051,212 B2 | 5/2006 | Ginter et al. |
| 7,054,888 B2 | 5/2006 | LaChapelle et al. |
| 7,058,608 B1 | 6/2006 | Nagata et al. |
| 7,065,342 B1 | 6/2006 | Rolf |
| 7,076,652 B2 | 7/2006 | Ginter et al. |
| 7,095,854 B1 | 8/2006 | Ginter et al. |
| 7,096,234 B2 | 8/2006 | Plastina et al. |
| 7,099,846 B1 | 8/2006 | Ishibashi et al. |
| 7,100,199 B2 | 8/2006 | Ginter et al. |
| 7,107,395 B1 | 9/2006 | Ofek et al. |
| 7,111,009 B1 | 9/2006 | Gupta et al. |
| 7,113,767 B2 | 9/2006 | Vaeaenaenen |
| 7,113,912 B2 | 9/2006 | Stefik et al. |
| 7,120,800 B2 | 10/2006 | Ginter et al. |
| 7,124,302 B2 | 10/2006 | Ginter et al. |
| 7,127,454 B2 | 10/2006 | Deguchi |
| 7,133,845 B1 | 11/2006 | Ginter et al. |
| 7,136,874 B2 | 11/2006 | Mercer et al. |
| 7,146,404 B2 | 12/2006 | Kay et al. |
| 7,159,000 B2 | 1/2007 | Plastina et al. |
| 7,159,174 B2 | 1/2007 | Johnson et al. |
| 7,216,008 B2 | 5/2007 | Sakata |
| 7,216,290 B2 | 5/2007 | Goldstein et al. |
| 7,219,308 B2 | 5/2007 | Novak et al. |
| 7,227,073 B2 | 6/2007 | Kim |
| 7,256,341 B2 | 8/2007 | Plastina et al. |
| 7,262,357 B2 | 8/2007 | Plastina et al. |
| 7,275,063 B2 | 9/2007 | Horn |
| 7,277,852 B2 | 10/2007 | Iyoku et al. |
| 7,281,034 B1 | 10/2007 | Eyal |
| 7,290,285 B2 | 10/2007 | McCurdy et al. |
| 7,310,350 B1 | 12/2007 | Shao et al. |
| 7,345,234 B2 | 3/2008 | Plastina et al. |
| 7,358,434 B2 | 4/2008 | Plastina et al. |
| 7,395,339 B2 | 7/2008 | Kirkland |
| 7,409,639 B2 | 8/2008 | Dempski et al. |
| 7,421,656 B2 | 9/2008 | Fong et al. |
| 7,426,537 B2 | 9/2008 | Lee et al. |
| 7,454,406 B2 | 11/2008 | Kaplan et al. |
| 7,464,112 B2 | 12/2008 | Plastina et al. |
| 7,472,353 B1 | 12/2008 | Wolff et al. |
| 7,483,958 B1 | 1/2009 | Elabbady et al. |
| 7,521,625 B2 | 4/2009 | Robbin et al. |
| 7,533,105 B2 | 5/2009 | Mitchell et al. |
| 7,562,301 B1 | 7/2009 | Wolff et al. |
| 7,590,659 B2 | 9/2009 | Mercer et al. |
| 7,599,610 B2 | 10/2009 | Benyamin et al. |
| 7,617,278 B1 | 11/2009 | Edelman et al. |
| 7,620,467 B2 | 11/2009 | Lee et al. |
| 7,623,648 B1 | 11/2009 | Oppenheim et al. |
| 7,647,613 B2 | 1/2010 | Drakoulis et al. |
| 7,667,124 B2 | 2/2010 | Robbin et al. |
| 7,672,975 B2 | 3/2010 | Plastina et al. |
| 7,680,814 B2 | 3/2010 | Mercer et al. |
| 7,681,035 B1 | 3/2010 | Ayars et al. |
| 7,685,204 B2 | 3/2010 | Rogers |
| 7,685,642 B2 | 3/2010 | Gilliam et al. |
| 7,698,223 B2 | 4/2010 | Padawer et al. |
| 7,698,288 B2 | 4/2010 | Kawabe et al. |
| 7,698,654 B2 | 4/2010 | Fong et al. |
| 7,707,221 B1 | 4/2010 | Dunning et al. |
| 7,711,838 B1 | 5/2010 | Boulter et al. |
| 7,725,494 B2 | 5/2010 | Rogers et al. |
| 7,725,498 B2 | 5/2010 | Barsness et al. |
| 7,739,601 B1 | 6/2010 | Wong et al. |
| 7,739,723 B2 | 6/2010 | Rogers et al. |
| 7,743,329 B2 | 6/2010 | Rahman et al. |
| 7,747,620 B2 | 6/2010 | Beaupre |
| 7,757,171 B1 | 7/2010 | Wong et al. |
| 7,757,182 B2 | 7/2010 | Elliott et al. |
| 7,765,192 B2 | 7/2010 | Svendsen |
| 7,765,245 B2 | 7/2010 | Nichols et al. |
| 7,769,903 B2 | 8/2010 | Robbin et al. |
| 7,774,713 B2 | 8/2010 | Mital et al. |
| 7,779,355 B1 | 8/2010 | Erol et al. |
| 7,797,446 B2 | 9/2010 | Heller et al. |
| 7,797,454 B2 | 9/2010 | Apostolopoulos et al. |
| 7,805,677 B2 | 9/2010 | Takakuwa et al. |
| 7,818,350 B2 | 10/2010 | New et al. |
| 7,827,259 B2 | 11/2010 | Heller et al. |
| 7,827,312 B2 | 11/2010 | Ramaswamy et al. |
| 7,831,605 B2 | 11/2010 | Plastina et al. |
| 7,840,292 B2 | 11/2010 | Buil et al. |
| 7,840,620 B2 | 11/2010 | Vignoli et al. |
| 7,844,820 B2 | 11/2010 | Martinez |
| 7,844,835 B2 | 11/2010 | Ginter et al. |
| 7,856,404 B2 | 12/2010 | Evans et al. |
| 7,860,342 B2 | 12/2010 | Levien et al. |
| 7,860,830 B2 | 12/2010 | Mirrashidi et al. |
| 7,882,110 B2 | 2/2011 | Bahr |
| 7,890,598 B2 | 2/2011 | Lakamp |

(56) References Cited

U.S. PATENT DOCUMENTS

| | | |
|---|---|---|
| 7,895,334 B1 | 2/2011 | Tu et al. |
| 7,904,417 B2 | 3/2011 | Anderson et al. |
| 7,921,116 B2 | 4/2011 | Finkelstein et al. |
| 7,925,682 B2 | 4/2011 | Moore et al. |
| 7,925,976 B2 | 4/2011 | Shin et al. |
| 7,934,159 B1 | 4/2011 | Rahman et al. |
| 7,937,450 B2 | 5/2011 | Janik |
| 7,937,671 B2 | 5/2011 | Liebhold et al. |
| 7,956,272 B2 | 6/2011 | Wysocki et al. |
| 7,958,441 B2 | 6/2011 | Heller et al. |
| 7,966,551 B2 | 6/2011 | Plastina et al. |
| 7,970,799 B2 | 6/2011 | Arrouye et al. |
| 7,971,261 B2 | 6/2011 | Pestoni |
| 7,984,505 B2 | 7/2011 | Read |
| 7,985,911 B2 | 7/2011 | Oppenheimer et al. |
| 7,991,271 B2 | 8/2011 | Candelore |
| 8,028,038 B2 | 9/2011 | Weel |
| 8,028,323 B2 | 9/2011 | Weel |
| 8,041,186 B1 | 10/2011 | Black |
| 8,046,424 B2 | 10/2011 | Novik et al. |
| 8,126,938 B2 | 2/2012 | Cohen et al. |
| 8,161,411 B2 | 4/2012 | Robbin et al. |
| 8,316,128 B2 | 11/2012 | Beck et al. |
| 8,375,008 B1 | 2/2013 | Gomes |
| 8,447,697 B2 | 5/2013 | Wang et al. |
| 8,554,799 B2 | 10/2013 | Ott et al. |
| 8,644,684 B2 | 2/2014 | Yoshida et al. |
| 8,677,507 B2 | 3/2014 | Ginter et al. |
| 8,712,825 B1 | 4/2014 | Holcombe et al. |
| 2001/0013061 A1 | 8/2001 | DeMartin et al. |
| 2001/0014882 A1 | 8/2001 | Stefik et al. |
| 2001/0018858 A1 | 9/2001 | Dwek |
| 2001/0025256 A1 | 9/2001 | Oliphant et al. |
| 2001/0033296 A1 | 10/2001 | Fullerton et al. |
| 2001/0042107 A1 | 11/2001 | Palm |
| 2001/0047290 A1 | 11/2001 | Petras et al. |
| 2002/0001395 A1 | 1/2002 | Davis et al. |
| 2002/0002468 A1 | 1/2002 | Spagna et al. |
| 2002/0002498 A1 | 1/2002 | Hatakeyama |
| 2002/0003879 A1 | 1/2002 | Ibaraki et al. |
| 2002/0010652 A1 | 1/2002 | Deguchi |
| 2002/0010759 A1 | 1/2002 | Hitson et al. |
| 2002/0013784 A1 | 1/2002 | Swanson |
| 2002/0013852 A1 | 1/2002 | Janik |
| 2002/0040326 A1 | 4/2002 | Spratt |
| 2002/0042834 A1 | 4/2002 | Kremens et al. |
| 2002/0045960 A1 | 4/2002 | Phillips et al. |
| 2002/0049037 A1 | 4/2002 | Christensen et al. |
| 2002/0049594 A1 | 4/2002 | Moore et al. |
| 2002/0049731 A1 | 4/2002 | Kotani |
| 2002/0052885 A1 | 5/2002 | Levy |
| 2002/0052933 A1 | 5/2002 | Leonhard et al. |
| 2002/0054134 A1 | 5/2002 | Kelts |
| 2002/0069746 A1 | 6/2002 | Taira et al. |
| 2002/0072967 A1 | 6/2002 | Jacobs et al. |
| 2002/0078029 A1 | 6/2002 | Pachet |
| 2002/0080842 A1 | 6/2002 | An et al. |
| 2002/0083031 A1 | 6/2002 | De Varax et al. |
| 2002/0083060 A1* | 6/2002 | Wang .................. G10L 17/26 |
| 2002/0087887 A1 | 7/2002 | Busam et al. |
| 2002/0089529 A1 | 7/2002 | Robbin |
| 2002/0093884 A1 | 7/2002 | Hochendoner |
| 2002/0097401 A1 | 7/2002 | Maleki et al. |
| 2002/0099731 A1 | 7/2002 | Abajian |
| 2002/0103797 A1 | 8/2002 | Goel et al. |
| 2002/0107803 A1 | 8/2002 | Lisanke et al. |
| 2002/0107806 A1 | 8/2002 | Higashi et al. |
| 2002/0107850 A1 | 8/2002 | Sugimoto et al. |
| 2002/0108115 A1 | 8/2002 | Palmer |
| 2002/0113824 A1 | 8/2002 | Myers |
| 2002/0120925 A1 | 8/2002 | Logan |
| 2002/0122051 A1 | 9/2002 | Hose et al. |
| 2002/0126135 A1 | 9/2002 | Ball et al. |
| 2002/0128856 A1 | 9/2002 | Stefik et al. |
| 2002/0134220 A1 | 9/2002 | Yamane et al. |
| 2002/0138619 A1 | 9/2002 | Ramaley et al. |
| 2002/0143907 A1* | 10/2002 | Tsurubayashi .......... H04L 29/06 709/221 |
| 2002/0151327 A1 | 10/2002 | Levitt |
| 2002/0152173 A1 | 10/2002 | Rudd |
| 2002/0152267 A1 | 10/2002 | Lennon |
| 2002/0152278 A1* | 10/2002 | Pontenzone .......... H04H 20/42 709/217 |
| 2002/0154759 A1 | 10/2002 | Ishii |
| 2002/0156546 A1 | 10/2002 | Ramaswamy |
| 2002/0156704 A1 | 10/2002 | Kolls |
| 2002/0172457 A1 | 11/2002 | Tapalian et al. |
| 2002/0175931 A1 | 11/2002 | Holtz et al. |
| 2002/0184111 A1 | 12/2002 | Swanson |
| 2002/0184623 A1 | 12/2002 | Hodge et al. |
| 2002/0188363 A1 | 12/2002 | Ashy |
| 2002/0194195 A1 | 12/2002 | Fenton et al. |
| 2002/0194260 A1 | 12/2002 | Headley et al. |
| 2003/0001880 A1 | 1/2003 | Holtz et al. |
| 2003/0009423 A1 | 1/2003 | Wang et al. |
| 2003/0009427 A1 | 1/2003 | Wang et al. |
| 2003/0014477 A1 | 1/2003 | Oppenheimer et al. |
| 2003/0014767 A1 | 1/2003 | Stumphauzer et al. |
| 2003/0015464 A1* | 1/2003 | Marioni ............... A01K 63/045 210/167.21 |
| 2003/0023427 A1 | 1/2003 | Cassin et al. |
| 2003/0023975 A1 | 1/2003 | Schrader et al. |
| 2003/0028488 A1 | 2/2003 | Mohammed et al. |
| 2003/0028489 A1 | 2/2003 | Williamson |
| 2003/0028539 A1 | 2/2003 | Nunome et al. |
| 2003/0031176 A1 | 2/2003 | Sim |
| 2003/0037035 A1 | 2/2003 | Deguchi |
| 2003/0041108 A1 | 2/2003 | Henrick et al. |
| 2003/0046273 A1 | 3/2003 | Deshpande |
| 2003/0046399 A1 | 3/2003 | Boulter et al. |
| 2003/0049866 A1 | 3/2003 | Bushway et al. |
| 2003/0050834 A1 | 3/2003 | Caplan |
| 2003/0050919 A1 | 3/2003 | Brown et al. |
| 2003/0051149 A1 | 3/2003 | Robert |
| 2003/0051238 A1 | 3/2003 | Barone |
| 2003/0055743 A1 | 3/2003 | Murcko |
| 2003/0065639 A1 | 4/2003 | Fiennes et al. |
| 2003/0071851 A1 | 4/2003 | Unger et al. |
| 2003/0088571 A1 | 5/2003 | Ekkel |
| 2003/0093790 A1* | 5/2003 | Logan .................. G10H 1/0033 725/38 |
| 2003/0096302 A1 | 5/2003 | Yguerabide et al. |
| 2003/0110228 A1 | 6/2003 | Xu et al. |
| 2003/0110502 A1 | 6/2003 | Creed et al. |
| 2003/0112432 A1 | 6/2003 | Yguerabide et al. |
| 2003/0120928 A1 | 6/2003 | Cato et al. |
| 2003/0124733 A1 | 7/2003 | Bushway et al. |
| 2003/0131252 A1 | 7/2003 | Barton |
| 2003/0135464 A1 | 7/2003 | Mourad et al. |
| 2003/0135513 A1 | 7/2003 | Quinn et al. |
| 2003/0151618 A1 | 8/2003 | Johnson et al. |
| 2003/0158737 A1 | 8/2003 | Csicsatka |
| 2003/0158780 A1 | 8/2003 | Isobe et al. |
| 2003/0167236 A1 | 9/2003 | Stefik et al. |
| 2003/0172090 A1 | 9/2003 | Asunmaa et al. |
| 2003/0174861 A1 | 9/2003 | Levy et al. |
| 2003/0174923 A1 | 9/2003 | Arnold et al. |
| 2003/0176937 A1 | 9/2003 | Janky et al. |
| 2003/0182254 A1 | 9/2003 | Plastina et al. |
| 2003/0182315 A1 | 9/2003 | Plastina et al. |
| 2003/0182328 A1 | 9/2003 | Paquette et al. |
| 2003/0182428 A1 | 9/2003 | Li et al. |
| 2003/0182579 A1 | 9/2003 | Leporini et al. |
| 2003/0191753 A1 | 10/2003 | Hoch |
| 2003/0195863 A1 | 10/2003 | Marsh |
| 2003/0200452 A1 | 10/2003 | Tagawa et al. |
| 2003/0202431 A1 | 10/2003 | Kim et al. |
| 2003/0212710 A1 | 11/2003 | Guy |
| 2003/0217170 A1 | 11/2003 | Nelson et al. |
| 2003/0219225 A1 | 11/2003 | Horii et al. |
| 2003/0220830 A1 | 11/2003 | Myr |
| 2003/0221167 A1 | 11/2003 | Goldstein et al. |
| 2003/0221541 A1 | 12/2003 | Platt |
| 2003/0222907 A1 | 12/2003 | Heikes et al. |

(56) References Cited

U.S. PATENT DOCUMENTS

| | | |
|---|---|---|
| 2003/0223411 A1 | 12/2003 | De La Fuente |
| 2003/0225834 A1 | 12/2003 | Lee et al. |
| 2003/0225848 A1 | 12/2003 | Heikes et al. |
| 2003/0228134 A1 | 12/2003 | Kim et al. |
| 2003/0229537 A1 | 12/2003 | Dunning et al. |
| 2003/0231188 A1 | 12/2003 | Cohen et al. |
| 2003/0233363 A1 | 12/2003 | Cohen et al. |
| 2003/0233379 A1 | 12/2003 | Cohen et al. |
| 2003/0235402 A1 | 12/2003 | Seo et al. |
| 2003/0236582 A1 | 12/2003 | Zamir et al. |
| 2003/0236711 A1 | 12/2003 | Deguchi |
| 2003/0236832 A1 | 12/2003 | McIntyre et al. |
| 2003/0237043 A1 | 12/2003 | Novak et al. |
| 2004/0002938 A1 | 1/2004 | Deguchi |
| 2004/0003046 A1* | 1/2004 | Grabelsky ............ H04L 65/608 709/206 |
| 2004/0003090 A1 | 1/2004 | Deeds |
| 2004/0003398 A1 | 1/2004 | Donian et al. |
| 2004/0003403 A1 | 1/2004 | Marsh |
| 2004/0003706 A1 | 1/2004 | Tagawa et al. |
| 2004/0008872 A1 | 1/2004 | Goldberg |
| 2004/0019497 A1 | 1/2004 | Volk et al. |
| 2004/0019658 A1 | 1/2004 | Plastina et al. |
| 2004/0024652 A1 | 2/2004 | Buhse et al. |
| 2004/0024886 A1 | 2/2004 | Saxena |
| 2004/0031058 A1 | 2/2004 | Reisman |
| 2004/0034582 A1 | 2/2004 | Gilliam et al. |
| 2004/0034849 A1 | 2/2004 | Cohen et al. |
| 2004/0049694 A1 | 3/2004 | Candelore |
| 2004/0055445 A1 | 3/2004 | Iyoku et al. |
| 2004/0056901 A1 | 3/2004 | March et al. |
| 2004/0057348 A1 | 3/2004 | Shteyn et al. |
| 2004/0057449 A1 | 3/2004 | Black |
| 2004/0064209 A1 | 4/2004 | Zhang |
| 2004/0064476 A1 | 4/2004 | Rounds |
| 2004/0064512 A1 | 4/2004 | Arora et al. |
| 2004/0064692 A1 | 4/2004 | Kahn et al. |
| 2004/0064832 A1 | 4/2004 | Tsukidate et al. |
| 2004/0068606 A1 | 4/2004 | Kim et al. |
| 2004/0070678 A1 | 4/2004 | Toyama et al. |
| 2004/0073427 A1 | 4/2004 | Moore |
| 2004/0078357 A1* | 4/2004 | LaChapelle ........... G11B 27/034 |
| 2004/0078383 A1 | 4/2004 | Mercer et al. |
| 2004/0083273 A1 | 4/2004 | Madison et al. |
| 2004/0088348 A1 | 5/2004 | Yeager et al. |
| 2004/0103153 A1 | 5/2004 | Chang et al. |
| 2004/0109137 A1 | 6/2004 | Bubie et al. |
| 2004/0117442 A1 | 6/2004 | Thielen |
| 2004/0117455 A1 | 6/2004 | Kaminsky et al. |
| 2004/0117843 A1 | 6/2004 | Karaoguz et al. |
| 2004/0123725 A1 | 7/2004 | Kim |
| 2004/0128308 A1 | 7/2004 | Obrador |
| 2004/0128353 A1 | 7/2004 | Goodman et al. |
| 2004/0137882 A1 | 7/2004 | Forsyth |
| 2004/0143604 A1 | 7/2004 | Glenner et al. |
| 2004/0146275 A1 | 7/2004 | Takata et al. |
| 2004/0148353 A1 | 7/2004 | Karaoguz et al. |
| 2004/0148564 A1 | 7/2004 | Takata et al. |
| 2004/0162871 A1 | 8/2004 | Pabla et al. |
| 2004/0162878 A1 | 8/2004 | Lewis et al. |
| 2004/0165006 A1 | 8/2004 | Kirby et al. |
| 2004/0172456 A1 | 9/2004 | Green et al. |
| 2004/0174905 A1 | 9/2004 | Caspi et al. |
| 2004/0177115 A1 | 9/2004 | Hollander et al. |
| 2004/0177319 A1 | 9/2004 | Horn |
| 2004/0181487 A1 | 9/2004 | Hanson |
| 2004/0181517 A1 | 9/2004 | Jung et al. |
| 2004/0181540 A1 | 9/2004 | Jung et al. |
| 2004/0184778 A1 | 9/2004 | Jung et al. |
| 2004/0196315 A1 | 10/2004 | Swearingen et al. |
| 2004/0199387 A1 | 10/2004 | Wang et al. |
| 2004/0199471 A1 | 10/2004 | Hardjono |
| 2004/0199514 A1 | 10/2004 | Rosenblatt et al. |
| 2004/0199667 A1 | 10/2004 | Dobbins |
| 2004/0200261 A1 | 10/2004 | Shuman |
| 2004/0201609 A1 | 10/2004 | Obrador |
| 2004/0202335 A1 | 10/2004 | Lee et al. |
| 2004/0205028 A1 | 10/2004 | Verosub et al. |
| 2004/0215718 A1 | 10/2004 | Kazmi et al. |
| 2004/0215731 A1 | 10/2004 | Tzann-En Szeto et al. |
| 2004/0220791 A1 | 11/2004 | Lamkin et al. |
| 2004/0220926 A1 | 11/2004 | Lamkin |
| 2004/0221299 A1 | 11/2004 | Gibbs et al. |
| 2004/0221322 A1 | 11/2004 | Shen et al. |
| 2004/0223606 A1 | 11/2004 | Enete et al. |
| 2004/0224675 A1 | 11/2004 | Puskoor et al. |
| 2004/0226039 A1 | 11/2004 | Jung et al. |
| 2004/0228618 A1 | 11/2004 | Yoo et al. |
| 2004/0230672 A1 | 11/2004 | Zuckerberg et al. |
| 2004/0236568 A1 | 11/2004 | Guillen et al. |
| 2004/0243592 A1 | 12/2004 | Bill |
| 2004/0252400 A1 | 12/2004 | Blank et al. |
| 2004/0252604 A1 | 12/2004 | Johnson et al. |
| 2004/0254669 A1 | 12/2004 | Badar |
| 2004/0254887 A1 | 12/2004 | Jacoby |
| 2004/0255330 A1 | 12/2004 | Logan |
| 2004/0260753 A1 | 12/2004 | Regan |
| 2004/0260761 A1 | 12/2004 | Leaute et al. |
| 2004/0260835 A1 | 12/2004 | Welk et al. |
| 2004/0267552 A1 | 12/2004 | Gilliam et al. |
| 2004/0267812 A1 | 12/2004 | Harris et al. |
| 2005/0004985 A1 | 1/2005 | Stochosky |
| 2005/0004995 A1 | 1/2005 | Stochosky |
| 2005/0015389 A1 | 1/2005 | Novak et al. |
| 2005/0015713 A1 | 1/2005 | Plastina et al. |
| 2005/0015807 A1* | 1/2005 | Young ................ H04N 21/436 725/86 |
| 2005/0021398 A1 | 1/2005 | McCleskey et al. |
| 2005/0021418 A1 | 1/2005 | Marcus et al. |
| 2005/0021470 A1 | 1/2005 | Martin et al. |
| 2005/0021678 A1 | 1/2005 | Simyon et al. |
| 2005/0021750 A1 | 1/2005 | Abrams |
| 2005/0027539 A1 | 2/2005 | Weber et al. |
| 2005/0030937 A1 | 2/2005 | Wick et al. |
| 2005/0038707 A1 | 2/2005 | Roever et al. |
| 2005/0038724 A1 | 2/2005 | Roever et al. |
| 2005/0038794 A1 | 2/2005 | Pierol |
| 2005/0038814 A1 | 2/2005 | Iyengar et al. |
| 2005/0038819 A1 | 2/2005 | Hicken et al. |
| 2005/0038877 A1 | 2/2005 | Gupta et al. |
| 2005/0044229 A1 | 2/2005 | Brown et al. |
| 2005/0044574 A1 | 2/2005 | Lau et al. |
| 2005/0044893 A1 | 3/2005 | Coon et al. |
| 2005/0050446 A1 | 3/2005 | Miura et al. |
| 2005/0055472 A1 | 3/2005 | Krzyzanowski et al. |
| 2005/0060264 A1 | 3/2005 | Schrock et al. |
| 2005/0060350 A1 | 3/2005 | Baum et al. |
| 2005/0065912 A1 | 3/2005 | Cafrelli et al. |
| 2005/0065935 A1 | 3/2005 | Chebolu et al. |
| 2005/0071780 A1 | 3/2005 | Muller et al. |
| 2005/0076303 A1 | 4/2005 | Vaananen et al. |
| 2005/0076307 A1 | 4/2005 | Robbin |
| 2005/0080807 A1 | 4/2005 | Beilinson et al. |
| 2005/0086309 A1 | 4/2005 | Galli et al. |
| 2005/0086606 A1 | 4/2005 | Blennerhassett et al. |
| 2005/0091069 A1 | 4/2005 | Chuang |
| 2005/0091283 A1 | 4/2005 | Debique et al. |
| 2005/0091359 A1 | 4/2005 | Soin et al. |
| 2005/0091694 A1 | 4/2005 | Rambo |
| 2005/0096018 A1 | 5/2005 | White et al. |
| 2005/0097006 A1 | 5/2005 | Nyako |
| 2005/0102191 A1 | 5/2005 | Heller |
| 2005/0108176 A1 | 5/2005 | Jarol et al. |
| 2005/0108320 A1 | 5/2005 | Lord et al. |
| 2005/0108754 A1 | 5/2005 | Carhart et al. |
| 2005/0108770 A1 | 5/2005 | Karaoguz et al. |
| 2005/0114324 A1 | 5/2005 | Mayer |
| 2005/0114374 A1 | 5/2005 | Juszkiewicz et al. |
| 2005/0119976 A1 | 6/2005 | Taylor et al. |
| 2005/0122397 A1 | 6/2005 | Henson et al. |
| 2005/0123268 A1 | 6/2005 | Kawaguchi et al. |
| 2005/0131811 A1 | 6/2005 | Ranzini et al. |
| 2005/0132288 A1 | 6/2005 | Kirn et al. |
| 2005/0137984 A1 | 6/2005 | Nguyen et al. |

(56) References Cited

U.S. PATENT DOCUMENTS

| | | |
|---|---|---|
| 2005/0138543 A1 | 6/2005 | Liu |
| 2005/0144189 A1 | 6/2005 | Edwards et al. |
| 2005/0146996 A1 | 7/2005 | Roman |
| 2005/0149484 A1 | 7/2005 | Fox et al. |
| 2005/0149872 A1 | 7/2005 | Fong et al. |
| 2005/0154988 A1 | 7/2005 | Proehl et al. |
| 2005/0160111 A1 | 7/2005 | Plastina et al. |
| 2005/0165795 A1 | 7/2005 | Myka et al. |
| 2005/0172001 A1 | 8/2005 | Zaner et al. |
| 2005/0177716 A1 | 8/2005 | Ginter et al. |
| 2005/0182855 A1 | 8/2005 | Apostolopoulos et al. |
| 2005/0192871 A1 | 9/2005 | Galuten et al. |
| 2005/0192904 A1 | 9/2005 | Candelore |
| 2005/0197906 A1 | 9/2005 | Kindig et al. |
| 2005/0197961 A1 | 9/2005 | Miller et al. |
| 2005/0198193 A1 | 9/2005 | Halme |
| 2005/0198317 A1 | 9/2005 | Byers |
| 2005/0210396 A1 | 9/2005 | Galli |
| 2005/0210507 A1 | 9/2005 | Hawkins et al. |
| 2005/0216443 A1 | 9/2005 | Morton et al. |
| 2005/0216855 A1* | 9/2005 | Kopra ............... G06F 16/4387 715/767 |
| 2005/0223170 A1 | 10/2005 | Ushijima et al. |
| 2005/0223329 A1 | 10/2005 | Schwartz et al. |
| 2005/0227676 A1 | 10/2005 | De Vries et al. |
| 2005/0228665 A1 | 10/2005 | Kobayashi et al. |
| 2005/0234875 A1 | 10/2005 | Auerbach et al. |
| 2005/0234995 A1 | 10/2005 | Plastina et al. |
| 2005/0240494 A1 | 10/2005 | Cue et al. |
| 2005/0240615 A1 | 10/2005 | Barsness et al. |
| 2005/0240661 A1 | 10/2005 | Heller et al. |
| 2005/0246651 A1 | 11/2005 | Krzanowski |
| 2005/0246662 A1 | 11/2005 | Torrey et al. |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0262186 A1 | 11/2005 | Szeto et al. |
| 2005/0262204 A1* | 11/2005 | Szeto .................... G06Q 30/06 709/206 |
| 2005/0262529 A1 | 11/2005 | Neogi et al. |
| 2005/0262989 A1 | 12/2005 | Franzblau |
| 2005/0273399 A1 | 12/2005 | Soma et al. |
| 2005/0276277 A1 | 12/2005 | Pace |
| 2005/0276570 A1 | 12/2005 | Reed et al. |
| 2005/0288991 A1 | 12/2005 | Hubbard et al. |
| 2005/0289111 A1 | 12/2005 | Tribble et al. |
| 2006/0008256 A1* | 1/2006 | Khedouri ............. G06Q 20/206 386/234 |
| 2006/0010240 A1 | 1/2006 | Chuah |
| 2006/0020662 A1 | 1/2006 | Robinson |
| 2006/0021065 A1 | 1/2006 | Kamperman et al. |
| 2006/0026634 A1 | 2/2006 | LaChapelle et al. |
| 2006/0031770 A1 | 2/2006 | McMenamin et al. |
| 2006/0039255 A1 | 2/2006 | Seo et al. |
| 2006/0041627 A1 | 2/2006 | Tu |
| 2006/0041844 A1 | 2/2006 | Homiller |
| 2006/0053194 A1 | 3/2006 | Schneider et al. |
| 2006/0056324 A1 | 3/2006 | Hyyppa et al. |
| 2006/0080103 A1 | 4/2006 | Van Breemen |
| 2006/0085751 A1 | 4/2006 | O'Brien et al. |
| 2006/0088292 A1 | 4/2006 | Guillen et al. |
| 2006/0095502 A1 | 5/2006 | Lewis et al. |
| 2006/0095848 A1 | 5/2006 | Naik |
| 2006/0095852 A1 | 5/2006 | Trepess et al. |
| 2006/0100924 A1 | 5/2006 | Tevanian, Jr. |
| 2006/0107297 A1 | 5/2006 | Toyama et al. |
| 2006/0122946 A1 | 6/2006 | Fahrny et al. |
| 2006/0123058 A1 | 6/2006 | Mercer et al. |
| 2006/0123113 A1 | 6/2006 | Friedman |
| 2006/0129533 A1 | 6/2006 | Purvis |
| 2006/0130117 A1 | 6/2006 | Lee et al. |
| 2006/0133768 A1 | 6/2006 | Ellis, Jr. |
| 2006/0143084 A1 | 6/2006 | Donnelli et al. |
| 2006/0143236 A1 | 6/2006 | Wu |
| 2006/0156239 A1 | 7/2006 | Jobs et al. |
| 2006/0161635 A1 | 7/2006 | Lamkin et al. |
| 2006/0167804 A1 | 7/2006 | Aydar et al. |
| 2006/0167807 A1 | 7/2006 | Aydar et al. |
| 2006/0167985 A1 | 7/2006 | Albanese et al. |
| 2006/0167991 A1 | 7/2006 | Heikes et al. |
| 2006/0168340 A1 | 7/2006 | Heller et al. |
| 2006/0170759 A1 | 8/2006 | Roever et al. |
| 2006/0173825 A1 | 8/2006 | Hess et al. |
| 2006/0173838 A1 | 8/2006 | Garg et al. |
| 2006/0173974 A1 | 8/2006 | Tang |
| 2006/0174008 A1 | 8/2006 | Abanami |
| 2006/0190410 A1 | 8/2006 | Harper |
| 2006/0190616 A1 | 8/2006 | Mayerhofer et al. |
| 2006/0195403 A1 | 8/2006 | New et al. |
| 2006/0195462 A1 | 8/2006 | Rogers |
| 2006/0195512 A1 | 8/2006 | Rogers et al. |
| 2006/0195513 A1 | 8/2006 | Rogers et al. |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0212541 A1 | 9/2006 | Ueshima et al. |
| 2006/0218195 A1 | 9/2006 | LaChapelle et al. |
| 2006/0239131 A1 | 10/2006 | Nathan et al. |
| 2006/0242073 A1 | 10/2006 | Padawer et al. |
| 2006/0242259 A1 | 10/2006 | Vallabh et al. |
| 2006/0265421 A1 | 11/2006 | Ranasinghe et al. |
| 2006/0268667 A1 | 11/2006 | Jellison, Jr. et al. |
| 2006/0271794 A1 | 11/2006 | Nonaka et al. |
| 2006/0282858 A1 | 12/2006 | Csicsatka et al. |
| 2006/0294571 A1 | 12/2006 | Moore et al. |
| 2007/0005422 A1 | 1/2007 | Levien et al. |
| 2007/0005423 A1 | 1/2007 | Levien et al. |
| 2007/0005651 A1 | 1/2007 | Levien et al. |
| 2007/0005653 A1 | 1/2007 | Marsh |
| 2007/0006099 A1 | 1/2007 | Johnson et al. |
| 2007/0011206 A1 | 1/2007 | Gupta et al. |
| 2007/0016599 A1 | 1/2007 | Plastina et al. |
| 2007/0016865 A1 | 1/2007 | Johnson et al. |
| 2007/0044137 A1 | 2/2007 | Bennett |
| 2007/0050409 A1 | 3/2007 | Bugir et al. |
| 2007/0050413 A1 | 3/2007 | Kominek et al. |
| 2007/0067427 A1 | 3/2007 | Bugir et al. |
| 2007/0073596 A1 | 3/2007 | Alexander et al. |
| 2007/0074118 A1 | 3/2007 | Robbin et al. |
| 2007/0074619 A1 | 4/2007 | Vergo |
| 2007/0078777 A1 | 4/2007 | Demartini et al. |
| 2007/0078896 A1 | 4/2007 | Hayashi et al. |
| 2007/0083380 A1 | 4/2007 | Martinez |
| 2007/0083558 A1 | 4/2007 | Martinez |
| 2007/0083762 A1 | 4/2007 | Martinez |
| 2007/0094139 A1 | 4/2007 | Martinez |
| 2007/0124680 A1 | 5/2007 | Robbin et al. |
| 2007/0130544 A1 | 6/2007 | Kim et al. |
| 2007/0136240 A1 | 6/2007 | Wang et al. |
| 2007/0143365 A1 | 6/2007 | D'Souza et al. |
| 2007/0143740 A1 | 6/2007 | Hoerentrup et al. |
| 2007/0150499 A1 | 6/2007 | D'Souza et al. |
| 2007/0156792 A1 | 7/2007 | D'Souza et al. |
| 2007/0156793 A1 | 7/2007 | D'Souza et al. |
| 2007/0159934 A1 | 7/2007 | Weon |
| 2007/0162502 A1 | 7/2007 | Thomas et al. |
| 2007/0174321 A1 | 7/2007 | Viikari et al. |
| 2007/0191108 A1 | 8/2007 | Brunet De Courssou et al. |
| 2007/0198363 A1 | 8/2007 | Quoc et al. |
| 2007/0198364 A1 | 8/2007 | Quoc et al. |
| 2007/0198426 A1 | 8/2007 | Yates |
| 2007/0203984 A2 | 8/2007 | Alhusseini et al. |
| 2007/0226365 A1 | 9/2007 | Hildreth et al. |
| 2007/0247979 A1 | 10/2007 | Brillon et al. |
| 2007/0263865 A1 | 11/2007 | Cohen et al. |
| 2007/0266049 A1 | 11/2007 | Cohen et al. |
| 2007/0271184 A1 | 11/2007 | Niebert et al. |
| 2007/0274519 A1 | 11/2007 | Cohen et al. |
| 2007/0276757 A1 | 11/2007 | Cohen et al. |
| 2007/0294295 A1 | 12/2007 | Finkelstein et al. |
| 2007/0294305 A1 | 12/2007 | Cohen et al. |
| 2007/0294720 A1 | 12/2007 | Cohen et al. |
| 2007/0299877 A1 | 12/2007 | Cohen et al. |

(56) References Cited

U.S. PATENT DOCUMENTS

| | | |
|---|---|---|
| 2008/0010083 A1 | 1/2008 | Cohen et al. |
| 2008/0013859 A1 | 1/2008 | Cohen et al. |
| 2008/0027747 A1 | 1/2008 | McGovern et al. |
| 2008/0027909 A1 | 1/2008 | Gang et al. |
| 2008/0028422 A1 | 1/2008 | Cohen et al. |
| 2008/0033979 A1 | 2/2008 | Vignoli et al. |
| 2008/0046439 A1 | 2/2008 | Miller et al. |
| 2008/0052104 A1 | 2/2008 | Cohen et al. |
| 2008/0052161 A1 | 2/2008 | Cohen et al. |
| 2008/0059530 A1 | 3/2008 | Cohen et al. |
| 2008/0077954 A1 | 3/2008 | Cohen et al. |
| 2008/0086379 A1 | 4/2008 | Dion et al. |
| 2008/0086380 A1 | 4/2008 | Cohen et al. |
| 2008/0092168 A1 | 4/2008 | Logan et al. |
| 2008/0133576 A1 | 6/2008 | Hempleman et al. |
| 2008/0162641 A1 | 7/2008 | Chandra et al. |
| 2008/0178238 A1 | 7/2008 | Khedouri et al. |
| 2008/0193101 A1 | 8/2008 | Agnihotri et al. |
| 2008/0201299 A1 | 8/2008 | Lehikoinen et al. |
| 2008/0209231 A1 | 8/2008 | Kim et al. |
| 2008/0215882 A1 | 9/2008 | Coldicott et al. |
| 2008/0229399 A1 | 9/2008 | O'Neil et al. |
| 2008/0235142 A1 | 9/2008 | Gonze et al. |
| 2008/0269931 A1 | 10/2008 | Martinez |
| 2008/0313233 A1 | 12/2008 | Cohen et al. |
| 2009/0024619 A1 | 1/2009 | Dallmeier et al. |
| 2009/0037243 A1 | 2/2009 | Cohen et al. |
| 2009/0037278 A1 | 2/2009 | Cohen et al. |
| 2009/0070213 A1 | 3/2009 | Miller et al. |
| 2009/0106696 A1 | 4/2009 | Duarte |
| 2009/0138484 A1 | 5/2009 | Ramos et al. |
| 2009/0150199 A1 | 6/2009 | Cohen et al. |
| 2009/0150444 A1 | 6/2009 | Cohen et al. |
| 2009/0151004 A1 | 6/2009 | Cohen et al. |
| 2009/0151008 A1 | 6/2009 | Cohen et al. |
| 2009/0158155 A1 | 6/2009 | Quinn et al. |
| 2009/0177654 A1 | 7/2009 | Beaupre et al. |
| 2009/0204475 A1 | 8/2009 | Cohen et al. |
| 2009/0210946 A1 | 8/2009 | Cohen et al. |
| 2009/0217343 A1 | 8/2009 | Bellwood et al. |
| 2009/0235364 A1 | 9/2009 | Cohen et al. |
| 2009/0259623 A1 | 10/2009 | Mooneyham et al. |
| 2009/0300480 A1 | 12/2009 | Cohen et al. |
| 2009/0307201 A1 | 12/2009 | Dunning et al. |
| 2010/0008506 A1 | 1/2010 | Lisanke et al. |
| 2010/0017885 A1 | 1/2010 | Cohen et al. |
| 2010/0154065 A1 | 6/2010 | Cohen et al. |
| 2010/0172540 A1 | 7/2010 | Davis et al. |
| 2010/0185306 A1 | 7/2010 | Rhoads |
| 2010/0205166 A1 | 8/2010 | Boulter et al. |
| 2010/0321519 A1 | 12/2010 | Bill |
| 2011/0185042 A1 | 7/2011 | Wohlert et al. |
| 2011/0235801 A1 | 9/2011 | Peterka et al. |
| 2011/0239280 A1 | 9/2011 | Chandra et al. |
| 2011/0247077 A1 | 10/2011 | Nguyen et al. |
| 2011/0271116 A1 | 11/2011 | Martinez |
| 2011/0307832 A1 | 12/2011 | Audet |
| 2011/0317985 A1 | 12/2011 | Black |
| 2012/0011592 A1 | 1/2012 | Loytynoja et al. |
| 2012/0087637 A1 | 4/2012 | Logan et al. |
| 2012/0331386 A1 | 12/2012 | Hicken et al. |
| 2013/0055408 A1 | 2/2013 | Hall et al. |
| 2013/0173656 A1 | 7/2013 | Spiegelman et al. |
| 2013/0179949 A1 | 7/2013 | Shapiro |
| 2014/0002462 A1 | 1/2014 | Jiang et al. |
| 2014/0310407 A1 | 10/2014 | Zhang et al. |
| 2017/0064408 A1 | 3/2017 | Ketola et al. |

FOREIGN PATENT DOCUMENTS

| | | | |
|---|---|---|---|
| EP | 1548740 | A2 | 6/2005 |
| JP | 2000020434 | A | 1/2000 |
| JP | 2001022844 | A | 1/2001 |
| JP | 2001160003 | A | 6/2001 |
| JP | 2001515617 | A | 9/2001 |
| JP | 2001527668 | A | 12/2001 |
| JP | 2002133147 | A | 5/2002 |
| JP | 2002183152 | A | 6/2002 |
| JP | 2003006364 | A | 1/2003 |
| JP | 2003233690 | A | 8/2003 |
| JP | 2004005309 | A | 1/2004 |
| KR | 20011175272 | A | 8/2001 |
| WO | 0054187 | A1 | 9/2000 |
| WO | 0233579 | A1 | 4/2002 |
| WO | 02071678 | A2 | 9/2002 |
| WO | 2004046874 | A2 | 6/2004 |
| WO | 2005071569 | A1 | 8/2005 |

OTHER PUBLICATIONS

Macedonia, Michael, "Distributed File Sharing: Barbarians at the Gates?", Computer, vol. 33, Issue 8, Aug. 2000, pp. 99-101.

Swierk, Edward, et al., "The Roma Personal Metadata Service", Mobile Networks and Applications, vol. 7, No. 5, Oct. 2002, pp. 407-418.

Qian, Yuechen, et al., "Exploring the Potentials of Combining Photo Annotating Tasks with Instant Messaging Fun", MUM 2004, College Park, MD, Oct. 27-29, 2004, pp. 11-17.

Regan, Tim, et al., "Media Center Buddies: Instant Messaging Around a Media Center", NordiCHI "04, Tampere, Finland, Oct. 23-27, 2004, pp. 141-144.

Gottesman, Ben Z., "IM Your Photos", PCMag.com, Dec. 11, 2003, pp. 1-2 (downloaded from:www.pcmag.com/printarticle2/0,1217,a=114405,OO.asp).

Bassoli, Arianna, et al., "TunA: A Mobile Music Experience to Foster Local Interactions", UbiComp 2003, Seattle, WA, Oct. 12-15, 2003, pp. 1-2.

Grinter, Rebecca E., et al., "Instant Messaging in Teen Life", CSCW"02, New Orleans, LA, Nov. 16-20, 2002, pp. 21-30.

Qian, Yuechen, et al., "Turning Photo Annotating Tasks into Instant Messaging Fun: Prototyping, User Trials and Roadmapping", ICEC 2004, LCNS 3166, vol. 3166/2004, Springer, Berlin, Aug. 4, 2004, pp. 610-613.

Coursey, David, "My Favorite Ways to Share Digital Photos", ZDNet, Nov. 7, 2003, pp. 1-3 (downloaded from:review.zdnet.com/AnchorDesk/4520-7298_16-5103567.html).

Bolcer, Gregory Alan., "Magi: An Architecture for Mobile and Disconnected Workflow", IEEE Internet Computing, vol. 4 Issue 3, May/Jun. 2000, pp. 46-54.

Dunn, Jon W., et al., "Variations: A Digital Music Library System at Indiana University", DL 99, Berkeley, CA, 1999, pp. 12-19.

Rajani, Rakhi E., et aL., "Viewing and Annotating Media with MemoryNet", CHI 2004, Vienna, Austria, Apr. 24-29, 2004, pp. 1517-1520.

Microsoft Computer Dictionary, 4th Edition, Microsoft Press, Redmond, WA, 1999, p. 348.

David Bainbridge, Sally Jo Cunningham, and J. Stephen Downie—"Visual Collaging of Music in a Digital Library"http://hdl.handle.net/10289/43—In Proceedings: Fifth International Conference on Music Information Retrieval. ISMIR 2004: Oct. 10-14, 2004, Barcelona, Spain. (c) 2004 Universitat Pompeu Fabra n—(pp. 1-6).

Mark van Setten and Erik Oltmans—"Demonstration of a Distributed MPEG-7 Video Search and Retrieval Application in the Educational Domain"—Proceeding Multimedia "01 Proceedings of the ninth ACM international conference on Multimedia 2001 ACM Sep.-Oct. 5, 2001, Ottawa, Canada—(pp. 595-596).

"XSPF: XML Shareable Playlist Format: Specifications—The XSPF Playlist Format, version 0", xspf.org/specs, May 2004, 14 pages.

XSPF: XML Shareable Playlist Format: Applications—Yahoo! Music Jukebox (Windows), xspf.org/applications, downloaded Apr. 13, 2011, 7 pages.

Drucker, Steven M., et al., "MediaBrowser: Reclaiming the Shoebox", AVI '04, Gallipoli, Italy, May 25-28, 2004, pp. 433-436.

Hayes, Conor, et al., "Context Boosting Collaborative Recommendation", Knowledge-Based Systems, vol. 17, Issues 2-4, May 2004, pp. 131-138.

(56) References Cited

OTHER PUBLICATIONS

Pachet, Francois, et al., "Content Management for Electronic Music Distribution", Communications of the ACM, vol. 46, No. 4,Apr. 2003, pp. 71-75.
Tzanetakis, George, "Musescape: A Tool for Changing Music Collections into Libraries", ECDL 2003, LNCS 2769, Springer-Verlag, Berlin, Feb. 26, 2004, pp. 412-421.
Pfeiffer, Silvia, et al., ""Annodex: A Simple Architecture to Enable Hyperlinking, SearchandRetrieval of Time-Continuous Data on the Web"", MIR"03, Berkeley, CA, Nov. 7, 2003, pp. 87-93.
Cano, Pedro, et al., "MTG-DB: A Repository for Music Audio Processing", WEDELMUSIC "04, Sep. 13-14, 2004, pp. 2-9.
Vinet, Hugues, et al., "The CUIDADO Project", IRCAM,2002, pp. 1-7.
Bayardo, Roberto J., et al., "Peer-to-Peer Sharing of Web Applications", WWW 2003, Budapest, Hungary, May 20-24, 2003, pp. 1-2.
Microsoft Computer Dictionary, 5th Edition, Microsoft Press, Redmond, WA,2002, pp. 19, 410, 539 and 542.
Torrens, Marc, et al., "Visualizing and Exploring Music Libraries", Universitat Pompeu Fabra,2004, pp. 1-8.
Maniar, Nipan, et al., "Dynamic Streaming Media—Creating Custom Programmes in Real-time", ACE '04, Singapore, Jun. 3-5, 2004, p. 349.
Gradman, Eric, "Distributed Social Software", Dec. 12, 2003, pp. 1-10.
Pachet, Francois, et al., "Popular Music Access: The Sony Music Browser", Journal of the American Society for Information Science and Technology, vol. 55, Issue 12, May 13, 2004, pp. 1037-1044.
Wolz, Ursula, et al., "r-Music, A Collaborative Music DJ for Ad Hoc Networks", WEDELMUSIC "04, Sep. 13-14, 2004, pp. 144-150.
Liu, Qiong, et al., "Digital Rights Management for Content Distribution", Proc. of the Australasian Information Security Workshop,Conf. on ACSW Frontiers 2003, vol. 21, Adelaide, Australia,2003, pp. 49-58.
Crossen, Andrew, et al., "Flytrap: Intelligent Group Music Recommendation", RIDE-VE '99, Sydney, Australia, Mar. 23-24, 1999, total 2 pages.
Hauver, David B., et al., "Flycasting: Using Collaborative Filtering to Generate a Playlist for Online Radio", WEDELMUSIC"01,Nov. 23-24, 2001, pp. 123-130.
Ku, William, et al., "Survey on the Technological Aspects of Digital Rights Management", ISC 2004, LNCS 3225, Springer Berlin,Sep. 21, 2004, pp. 391-403.
Liang, Qianhui, et al., "A United Approach to Discover Multimedia Web Services", ISMSE "03, Dec. 10-12, 2003, pp. 62-69.
Microsoft Computer Dictionary, 4th Edition, Microsoft Press, Redmond, WA,1999, pp. 348 and 461.
Rajani, Rakhi, et al., "Viewing and Annotating Media with MemoryNet", CHI 2004, Vienna, Austria, Apr. 24-29, 2004, pp. 1517-1520.
Stauffer. "How to do everything with iTunes for Macintosh and Windows." published Feb. 27, 2004. 11 pages.
Mac Observer. "iTunes 4 Tip—Sharing iTunes libraries over IP; It's not just for Rendezvous." published Apr. 29, 2003 to MacObserver.com. 2 pages.
Mclean et al. ("Interoperability between Information and Learning Environments—Bridging the Gaps,A Joint White Paper on behalf of the IMS Global Learning Consortium and the Coalition for Networked Information", Jun. 28, 2003, 13 pages).
Lundgren, Henrik, et al., "A Distributed Instant Messaging Architecture Based on the Pastry Peer-to-Peer Routing Substrate",SNCNW 2003,2003, pp. 1-3.
Bassoli, Andrea, et al., "tunA: Local Music Sharing with Handheld Wi-Fi Devices", Proc. of the 5th Wireless World Conf.,2004, pp. 1-23.
Aberer,Karl,"P-Grid: A Self-Organizing Access Structure for P2P Information Systems", CoopIS 2001, LNCS 2172, Springer-Verlag,Berlin Germany,2001, pp. 179-194.
Mei, Hsing, et al., "PP-COSE: A P2P Community Search Scheme", CIT "04, Sep. 14-16, 2004, pp. 1-8.
Isaacs, Ellen, et al., "Mobile Instant Messaging Through Hubbub", Communications of the ACM, vol. 45, Issue 9, Sep. 2002, pp. 68-72.
Bach, Erik, et al., "Bubbles: Navigating Multimedia Content in Mobile Ad-hoc Networks", ACM 1-58113-826-1/03/12,2003,pp. 73-80.
Milojicic, Dejan S., et al., "Peer-to-Peer Computing", HPL-2002-57,2002, pp. I and 1-51.
Moore, Julian, "tuna: Shared Audio Experience", Masters Thesis, University of Limerick, Sep. 2004, pp. i-xv and 1-100.
Regan, Tim, et al., "Media Center Buddies: Instant Messaging Around a Media Center", NordiCHI "04, Tampere, Finland, Oct. 23-27, 2004, pp. 141-144.
Pachet, Francois, et al., "Content Management for Electronic Music Distribution", Communications of the ACM, vol. 16, Issue 4,Apr. 2003, pp. 71-75.
Kawarasaki, Masatoshi, et al., "Metadata Associated Network Services and Capabilities", Proc. Int. Conf. on Dublin Core and Metadata for e-Communities,Firenze University Press, 2002, pp. 225-227.
Good, Nathaniel S., et al., "Usability and Privacy: A study of KaZaA P2P File-Sharing", CHI 2003, Ft. Lauderdale, FL, vol. 5 Issue 1,Apr. 5-10, 2003, pp. 137-144.
Hjelsvold, Rune, et al., "Web-Based Personalization and Management of Interactive Video", WWW 10, Hong Kong, May 1-5, 2001, pp. 129-139.
Lee, Kyung Hee, et al., "Requirements and Referential Software Architecture for home Server based Inter-Home Multimedia Collaboration Services", IEEE transactions on Consumer Electronics, vol. 50, Issue 1, Feb. 2004, pp. 145-150.
Haneef, Anwar M., et al., "ANMoLe—An Adaptive Multimedia Content Delivery Middleware Architecture for Heterogeneous Mobile Multi-Device Neighborhoods", Multimedia Tools and Applications, vol. 22, No. 2, Feb. 2004, pp. 171-186.
Swain, Michael J.,"Searching for Multimedia on the World Wide Web", IEEE Conf. on Multimedia Computing and Systems, vol. 1 .Jun. 7-11, 1999,pp. 32-37.
Lienhart, Rainer, et al., "Improving Media Services on P2P Networks", IEEE Internet Computing, vol. 6, Issue 1, Jan.-Feb. 2002, pp. 73-77.
Yi, B.K.;Subramanya, S.R.—"Enhancing personal communications with multimedia"—Browse JournalsandMagazines>Computer>vol. 37,Issue:6—Date of Publication:Jun. 21, 2004—pp. 79-81.
John Zimmerman—Carnegie Mellon University, Pittsburgh, PA—"Exploring the role of emotion in the interaction design of digital music players"—Proceeding DPPI "03 Proceedings of the 2003 international conference on Designing pleasurable products and interfaces—Jun. 23-26, 2003—pp. 152-153.
Imad M. Abbadi, Chris J. Mitchell, "Digital rights management using a mobile phone", Aug. 2007, ICEC"07: Proceedings of the ninth international conference on Electronic commerce, Publisher: ACM, pp. 185-194.
Miser et al., "iPod+iTunes Starter Kit", published by Que, First printing Oct. 2004, copyright 2005 Que Publishing.
Beverly Yang et al.,"Comparing Hybrid Peer-to-Peer Systems",Technical Report. Stanford.,Deposited on:Nov. 30, 2000 ,total 25 pages.
Brown J:"MP3 free-for-all" Internet Citation,XP002219000, Retrived from the Internet:URL:http://groups.google.com/groups?selm=Pine.GSU.4.10.10002050020300.161 71-100000%40adore.lightlik.comandoutput=gpl ain> [retrieved on Oct. 30, 2002],total 6 pages.
Guterman, Jimmy:"Will AOL Tame Aimster—file sharing system piggyback"s on AOL instant messaging" Online Article, [Online]Dec. 18, 2000(Dec. 18, 2000),pp. 1-3,XP002532806 Retrieved from the Internet: URL:http://findarticles.com/p/articles/mi_m0HVVW/is_51_3/ai_68156286/>,total 3 pages.
Richard Griscom,"Distant Music: Delivering Audio over the Internet",Published in Notes, vol. 59, No. 3, Mar. 2003, total 23 pages.
"New Rhapsody Lets Consumers Listen to and Share Music for Free, Legally",Seattle, Apr. 26 /PRNewswire-FirstCall/,printed out by Nov. 27, 2014,total 5 pages.

(56) References Cited

OTHER PUBLICATIONS

EPO:"Notice from the European Patent Office dated Oct. 1, 2007 concerning business methods",Official Journal of the European Patent Office, vol. 30, No. 11, Nov. 1, 2007, pp. 592-593, total 2 pages.
XP011112877 Ton Kalker et al.,"Music2Share—Copyright—Compliant Music Sharing in P2P Systems", Proceedings of the IEEE, vol. 92, No. 6, Jun. 2004,total 10 pages.
Davies, Nigel, et al., "Supporting Adaptive Video Applications in Mobile Environments", IEEE Communications Magazine, vol. 36, Issue 6, Jun. 1998, pp. 138-143.
Foreign Communication From a Counterpart Application, European Application No. EP 06736092, Supplementary European Search Report dated Aug. 20, 2009, 3 pages.
Foreign Communication From a Counterpart Application, European Application No. EP 06736090, Supplementary European Search Report dated Jun. 18, 2009, 4 pages.
Foreign Communication From a Counterpart Application, European Application No. EP 06815840, Supplementary European Search Report dated Sep. 2, 2009, 2 pages.
Foreign Communication From a Counterpart Application, PCT Application No. PCT/US2006/006440, International Preliminary Report on Patentability dated Sep. 25, 2007, 5 pages.
Foreign Communication From a Counterpart Application, PCT Application No. PCT/US2006/006934, International Preliminary Report on Patentability dated Sep. 11, 2007, 4 pages.
Foreign Communication From a Counterpart Application, PCT Application No. PCT/US2006/006932, International Preliminary Report on Patentability dated Mar. 17, 2009, 7 pages.
Foreign Communication From a Counterpart Application, PCT Application No. PCT/US06/06683, International Search Report and Written Opinion dated Oct. 19, 2007, 8 pages.
Foreign Communication From a Counterpart Application, PCT Application No. PCT/US2006/006687, Notification Concerning Submission or Transmittal of Priority Document dated Jul. 20, 2006, 1 page.
Foreign Communication From a Counterpart Application, PCT Application No. PCT/US06/06685, International Search Report dated Feb. 11, 2008, 5 pages.
Foreign Communication From a Counterpart Application, PCT Application No. PCT/US06/07124, International Search Report dated Dec. 5, 2007, 6 pages.
Foreign Communication From a Counterpart Application, PCT Application No. PCT/US06/006440, International Search Report dated Aug. 8, 2007, 5 pages.
Hurley, C., et al., "YouTube," Dec. 15, 2005, 5 pages.

\* cited by examiner

FIG. 8

METHOD FOR SHARING AND SEARCHING PLAYLISTS

CROSS-REFERENCE TO RELATED APPLICATIONS

This application is a continuation application of U.S. patent application Ser. No. 15/072,190, filed on Mar. 16, 2016, entitled "A Method for Sharing and Searching Playlists," which is a continuation application of U.S. patent application Ser. No. 14/635,720, filed on Mar. 2, 2015, entitled "Method for Sharing and Searching Playlists," which is a continuation application of U.S. patent application Ser. No. 13/679,711, filed on Nov. 16, 2012, entitled "Method for Sharing and Searching Playlists," which is a continuation of U.S. patent application Ser. No. 11/315,419, filed Dec. 21, 2005, entitled "Method for Sharing and Searching Playlists", which claims the benefit of U.S. Provisional Application No. 60/657,222, filed Feb. 28, 2005, entitled "A SYSTEM AND METHOD FOR DELIVERING MEDIA OVER A NETWORK," and U.S. Provisional Application No. 60/678,718, filed May 5, 2005, entitled "A SYSTEM AND METHOD FOR DELIVERING MEDIA OVER A NETWORK," all of which are incorporated by reference in their entireties.

BACKGROUND

The expansion of the Internet and the World Wide Web ("web") has given computer users the enhanced ability to listen to and to watch various different forms of media through their computers. This media can be in the form of audio music, music videos, television programs, sporting events or any other form of audio or video media that a user wishes to watch or listen to. As time evolved, users were able to take the music that was on that compact disc store it on their computers and listen to it locally. More recently, web systems were developed which allowed a user log on to a network such as the Internet and, using a media player, either listen to specific media chosen from a group of media that a particular service has to offer or listen to an array of media offerings such as a radio station wherein different songs or other forms of media are combined to allow a user to listen to a group of songs in sequence, whether chosen by the user or by the operators of the network service. For example such a service is Yahoo™ Music. Many media players, services and other software tools enable media to be organized by a user or a service into playlists, which, as the name connotes, are groups or lists of media files or file identifiers that can be used to effect playback by a user in a sequence or other selected or random order. Further, once a playlist is created, a user may manipulate and edit the playlists freely. However, what is lacking in each of the currently available systems is a method in which a user may easily share or make publicly available created playlists wherein such public playlists are searchable by key input parameters. Further, the current art lacks a sophisticated method of creating a playlist searchable by user-defined descriptor information.

SUMMARY

In one embodiment, the present disclosure provides a method for making a playlist available to the public. In another embodiment, the present disclosure provides a method for creating a playlist comprising user-defined descriptor information, which can be entered as free form text or prose rather than preselected information like a static genre or short title. In another embodiment, the present disclosure provides a method for searching for such public playlists.

In one embodiment, the present disclosure provides a method of identifying a published playlist comprising receiving, from a searching entity, search criteria representing a desire to identify a playlist; accessing a playlist storage, the playlist storage comprising user published playlists, some or all of the published playlists comprising associated user-defined playlist descriptor information, the user-defined playlist descriptor information comprising user developed text; searching the playlist storage to identify a desired playlist result set comprising user published playlists with user-defined playlist descriptor information relevant to the search criteria; and communicating the desired playlist result set to the searching entity.

In one embodiment, the searching entity comprises a user located on a computing device. In one embodiment, the searching entity comprises a software program.

In one embodiment, the search criteria comprises a mood associated with the desired playlist, a situation associated with the desired playlist, and/or an event associated with the desired playlist.

In one embodiment, the playlist storage is located on a server, on the internet, and/or is located as a part of an online media service.

In one embodiment, the desired playlist result set comprises a playlist identifier. In one embodiment, the identifier is a uniform resource locator, a pointer, and/or a universal resource indicator.

In one embodiment, the desired playlist result set comprises metadata associated with the desired playlist results set, and/or a permission level for accessing the desired playlist results. In one embodiment, the permission level is associated with an online media service. In one embodiment, the desired playlist result set comprises an id associated with the desired playlist.

In one embodiment, the method of identifying a published playlist further comprises facilitating the display of the desired playlist result set at computing device associated with the searching entity.

In one embodiment, the present disclosure provides for a method of creating a searchable playlist comprising: receiving at least one media file selection indicating the desire to include at least one media file in a playlist; receiving user-defined playlist descriptor information associated with the playlist, the user-defined playlist descriptor information comprising user developed text; receiving an input indicating the desire to designate the playlist as public, the public designation causing user-defined playlist descriptor information and information associated with the playlist to be searchable by a searching entity; and communicating to a playlist storage, user-defined playlist descriptor information and the associated playlist information so that the user developed text can be searched by a searching entity.

In one embodiment, identifying a published playlist, the playlist storage is located on a server, and/or the internet.

In one embodiment, the playlist storage is located as a part of an online media service.

In one embodiment, the published playlist information comprises information associated with at least one media file, the title associated with the media file, the artist associated with the media file, the genre associated with the media file, and/or a rating associated with the media file.

In one embodiment, the searching entity comprises a user and/or a software program.

In one embodiment, the user developed text is searchable by search input criteria. In one embodiment, the search criteria comprises a mood associated with the playlist, a situation associated with the desired playlist, and/or an event associated with the desired playlist.

In one embodiment, the user defined text comprises a mood associated with the desired playlist, a situation associated with the desired playlist, and/or an event associated with the desired playlist.

In one embodiment, the format comprises a set of searchable field entries. In one embodiment, the set of searchable field entries comprise a portion of the user defined text, all of the user defined text, and/or a portion of the playlist information.

In one embodiment, the method of creating a searchable playlist further comprises synchronizing, upon receiving an edit to the playlist, the user-defined playlist descriptor information and the associated playlist information with the playlist storage.

In one embodiment, the edit comprises an input indicating the desire to designate the playlist as private.

In one embodiment, storing the user-defined playlist descriptor information and the associated playlist information into a format comprises serializing the user-defined playlist descriptor information and the associated playlist information.

In one embodiment, the method further comprises synchronizing, upon receiving an edit to the playlist, the user-defined playlist descriptor information and the associated playlist information with the playlist storage.

In one embodiment, the present disclosure provides one or more computer-readable media having computer-readable instructions thereon which, when executed by one or more computing devices, implements the method of creating a searchable playlist comprising: receiving at least one media file selection indicating the desire to include at least one media file in a playlist; receiving user-defined playlist descriptor information associated with the playlist, the user-defined playlist descriptor information comprising user developed text; receiving an input indicating the desire to designate the playlist as public, the public designation causing user-defined playlist descriptor information and information associated with the playlist to be searchable by a searching entity; and communicating to a playlist storage, user-defined playlist descriptor information and the associated playlist information so that the user developed text can be searched by a searching entity.

In one embodiment, the present disclosure provides one or more computer-readable media having computer-readable instructions thereon which, when executed by one or more computing devices, implements the method of identifying a published playlist comprising receiving, from a searching entity, search criteria representing a desire to identify a playlist; accessing a playlist storage, the playlist storage comprising user published playlists, some or all of the published playlists comprising associated user-defined playlist descriptor information, the user-defined playlist descriptor information comprising user developed text; searching the playlist storage to identify a desired playlist result set comprising user published playlists with user-defined playlist descriptor information relevant to the search criteria; and communicating the desired playlist result set to the searching entity.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

The following drawing figures, which form a part of this application, are illustrative of embodiments of the present disclosure and are not meant to limit the scope of the disclosure in any manner, which scope shall be based on the claims appended hereto.

FIG. 8 is an exemplary user interface according to one exemplary embodiment;

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In one embodiment, the present disclosure provides a method for making a playlist available to the public. In another embodiment, the present disclosure provides a method for creating a playlist comprising user-defined descriptor information, which can be entered as free form text or prose rather than pre-selected information like a static genre or short title. In another embodiment, the present disclosure provides a method for searching for such public playlists.

In one embodiment the ability to publish, create, and search for a playlist is facilitated by a media management program. In a further embodiment a user interface of such a media management program allows a user to publish and search for playlists. In other embodiments, non-media management applications, programs, and/or servers are capable of searching for such published playlists.

Figure 3:
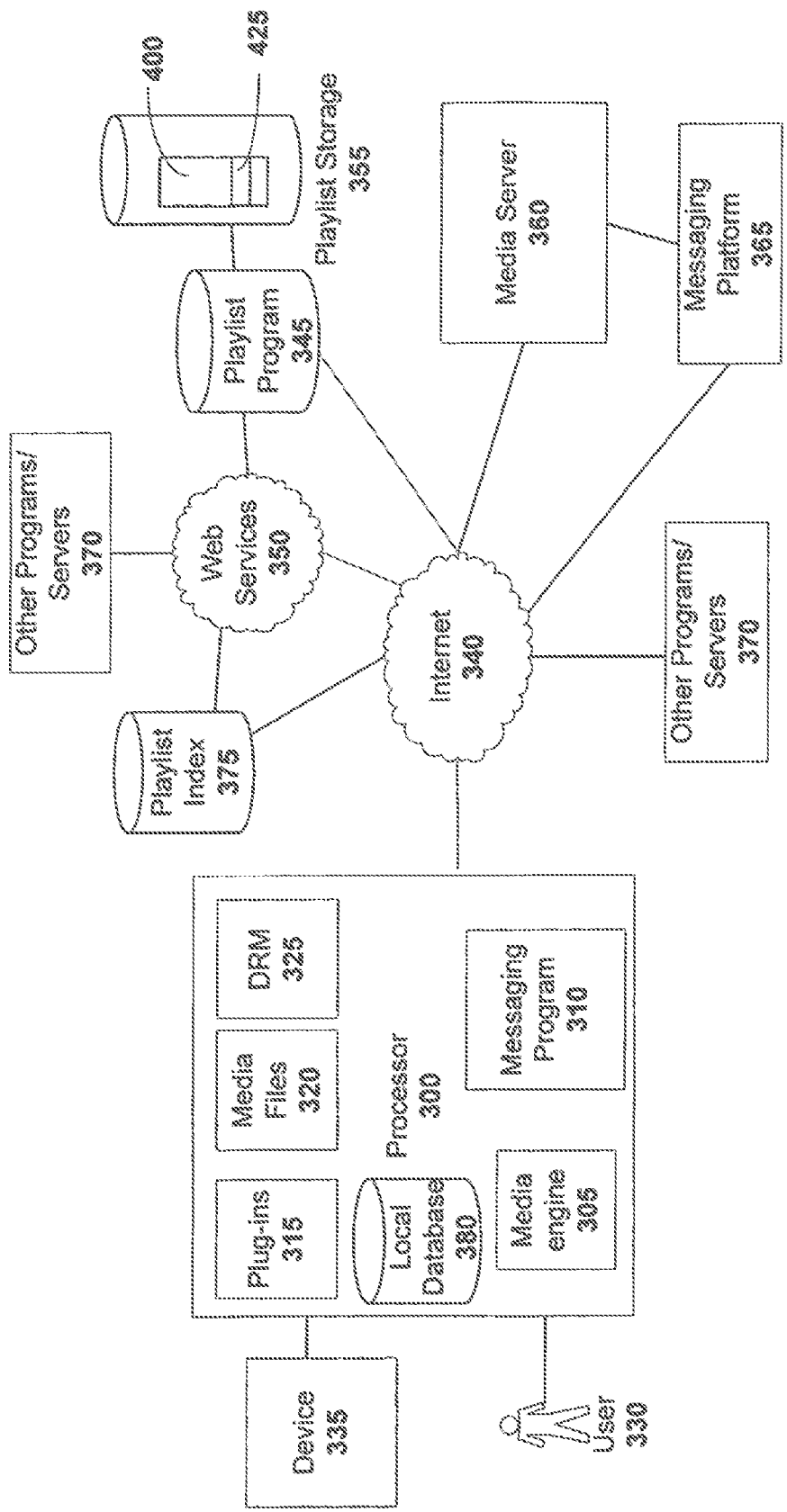
FIG. 3 is schematic illustrating an exemplary system architecture of one embodiment.
Figure 13:
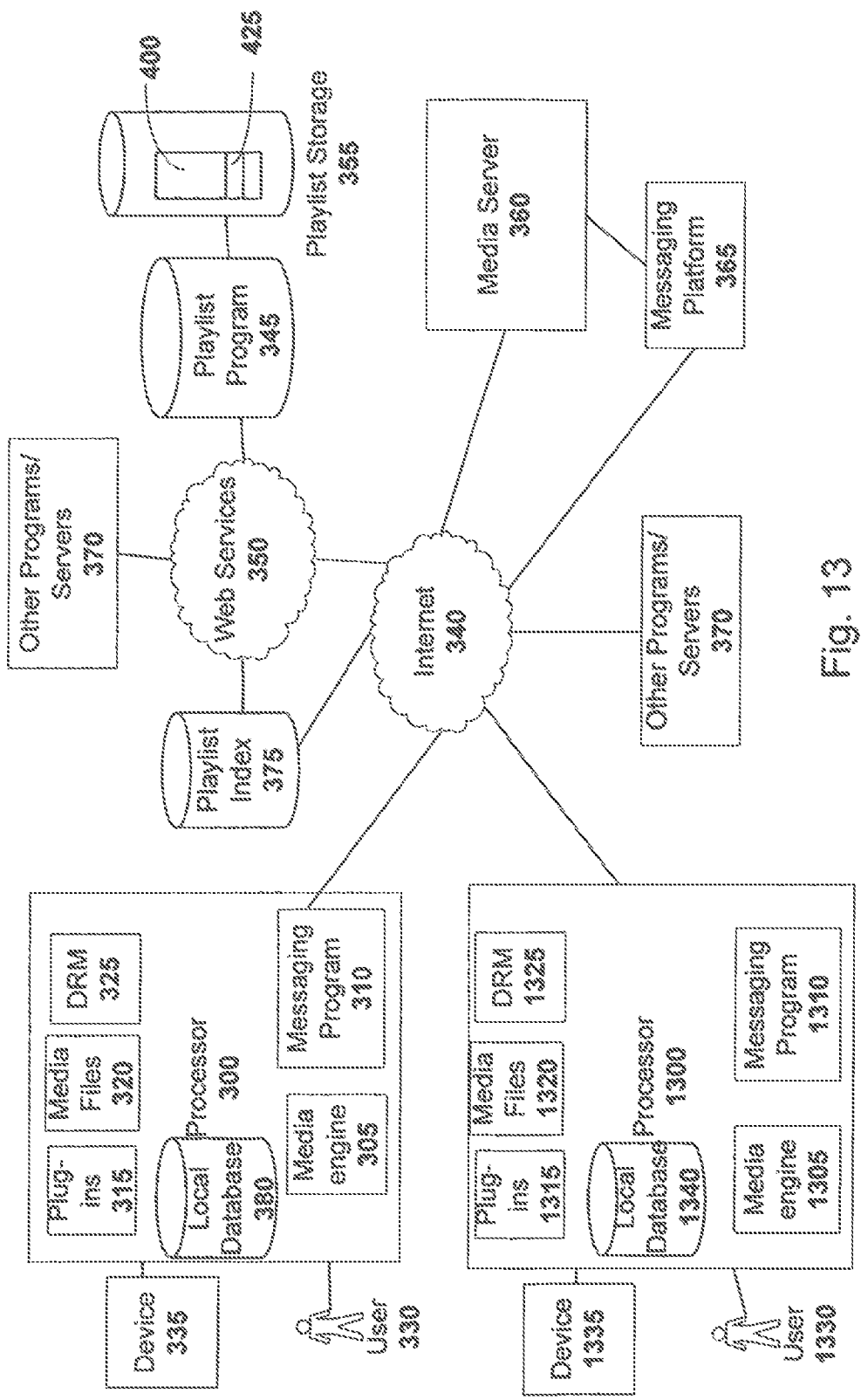
FIG. 13 is a schematic illustrating an exemplary system architecture of one embodiment.

FIG. 3 depicts an exemplary system configuration supporting the ability to publish, create, and search for a playlist. As can be seen in FIG. 3, the exemplary system configuration comprises a device 335 connected to a processor 300 associated with a user 330. Further embodiments contemplate multiple users each connected to the system configuration via a processor as depicted in FIG. 13. In one embodiment, the device may comprise any type of computing device capable of rendering media files. In another embodiment, the processor 300 may be located on a computing device, which can be, by way of non-limiting example, a personal computer, cellular telephone, personal digital assistant, or a portable media player, or any other device now known or to become known capable of carrying out the features and functions described herein. As seen in FIG. 3, the processor may comprise a media engine 305, a messaging program 310, digital rights management (dm) 325, media files 320, plug-in applications 315, and a local database 380 for storing information such as playlist information. In addition, through the internet 340, the processor 300 is connected to a media server 360, other programs and servers 370 and a messaging platform 365. Of course, the processor can comprise any combination of necessary components know to those skilled in the art in order to perform the functions described herein. Further depicted in FIG. 3, the processor 300 is connected via the interact 340 to a playlist program 345, a playlist storage 355, a playlist index 375, webservices 350, a media server 360, messenger platform 365, and other programs and servers 370. In one embodiment, the playlist program 345 manages the exchange of information to and from the playlist storage 355. In one embodiment, the playlist storage 355 stores all related playlist information. For example, as depicted in FIG. 3, the playlist storage stores playlist entries comprising user-defined descriptor information as further described herein. In one embodiment, the playlist index 375 stores a subset of the playlist information stored in the playlist storage 355 so that the processor 300 and/or other programs and servers 370 can easily and efficiently access the stored playlist information. In a further embodiment, only playlists which have been designated as public are stored in the playlist index 375. Thus, the playlist index 375 may be accessed when searching for public playlists. In one embodiment, the web services 350 provide efficient manner or way to access the playlist storage 355 and/or playlist index 375. In other embodiments, the webservices 350 may not be necessary to access the playlist storage 355 and/or a playlist index 375. In one embodiment, as depicted in FIG. 3, other programs or servers 370 are capable of being connected to the web services 350 and/or internet 340. For example, in some embodiments, other programs or servers 370 can communicate with the playlist index 375, playlist program 345, and/or playlist storage 355 alone or independent of the processor 300 and/or media server 360. Thus, as depicted in FIG. 3, playlists are searchable by any user, program, server, or any entity with an internet connection. In one aspect, the system configuration allows any other program and/or server 370, such as any non-media management program, to search for playlists and/or store created and/or published playlists for searching. For example, a user could search for playlists, i.e./e. access the playlist index and/or playlist storage, from a search tool found in a downloadable toolbar such as for example the downloadable Yahoo! Toolbar. With reference to FIG. 3, multiple variations and combinations of connections among the various components are contemplated. Furthermore, FIG. 3 is merely exemplary and not meant to limit the system configuration or architecture supporting the present disclosure in any way. Obvious variations of the components and configurations know to those skilled in the art are contemplated.

Figure 1:
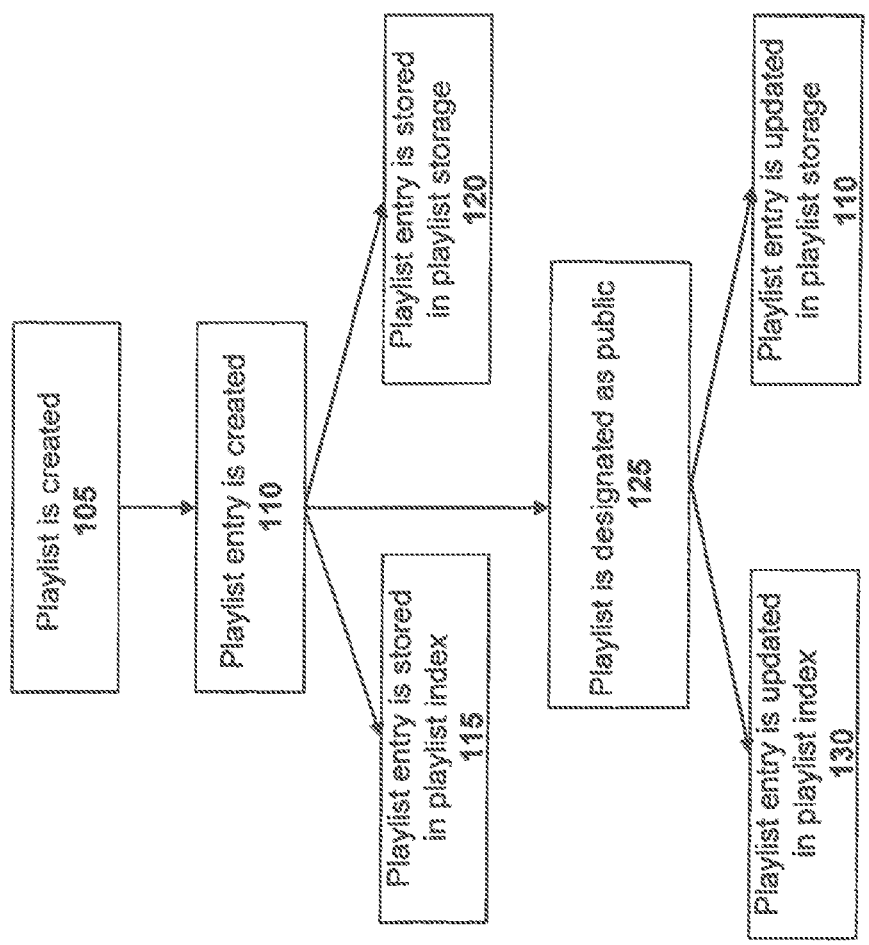
FIG. 1 is an exemplary flowchart illustrating a method according to one exemplary embodiment.
Figure 2:
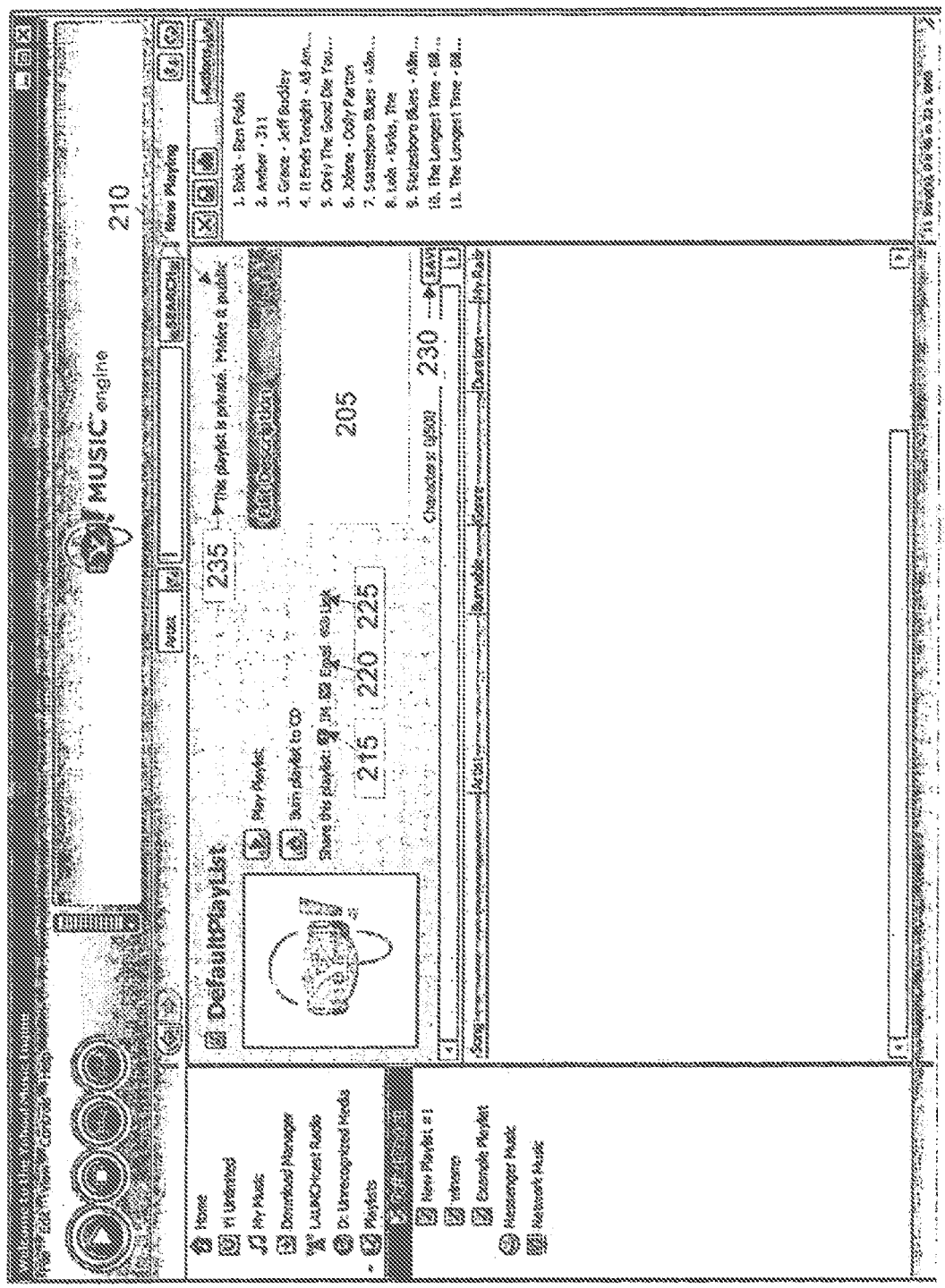
FIG. 2 is an exemplary user interface according to one exemplary embodiment.
Figure 5:
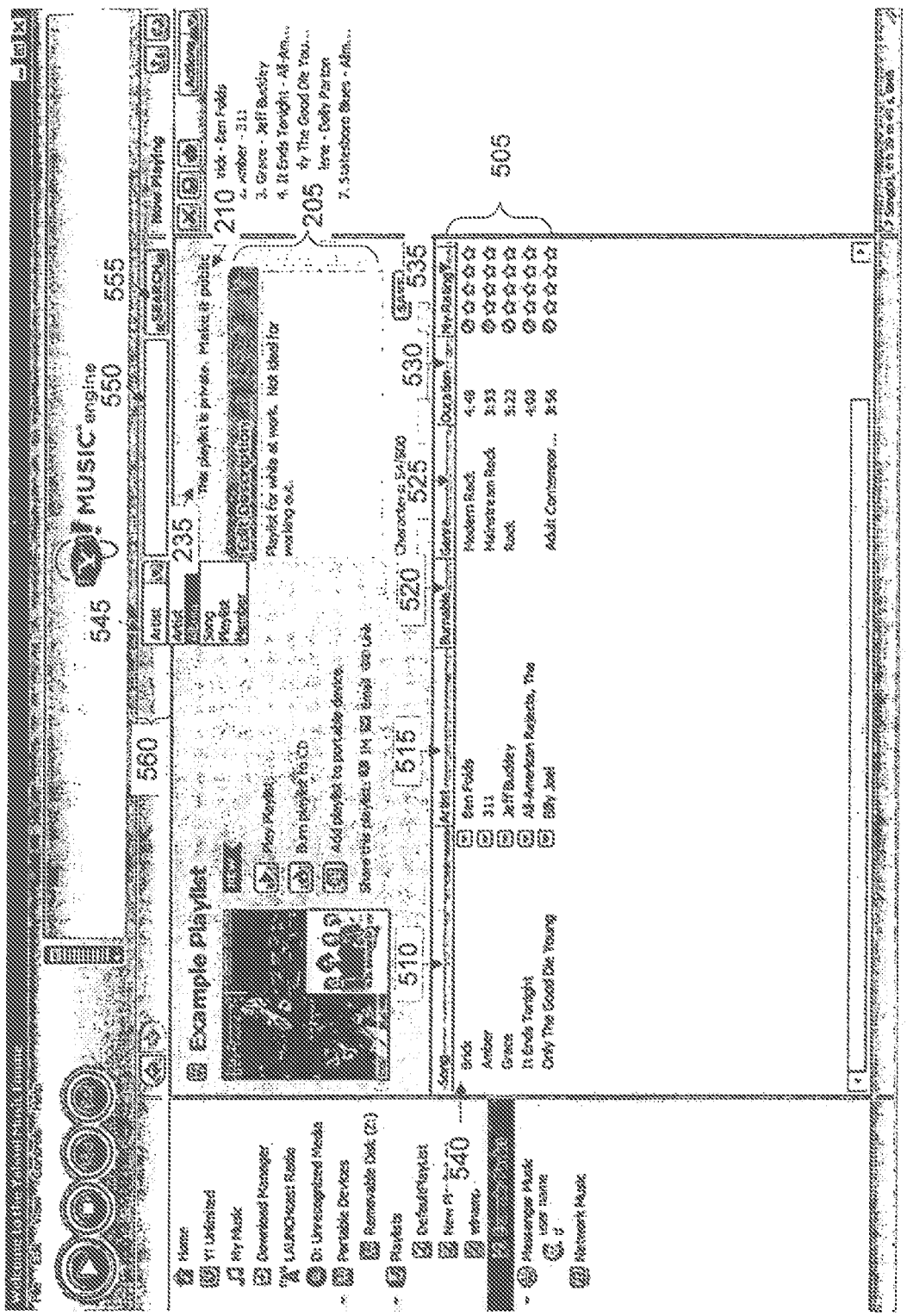
FIG. 5 is an exemplary user interface according to one exemplary embodiment.

The publishing of a playlist according to one embodiment of the present disclosure will now be discussed with reference to FIG. 1 that depicts an exemplary method of the present disclosure. In one embodiment, referring to FIG. 1, first, the user creates 105 a playlist. This playlist can be created in any number of different ways (i.e., user created, criteria playlists, affinity playlists) as known in the art. In one embodiment, a playlist comprises at least one media file and/or media file identifier. In one embodiment, once the playlist is created or during playlist creation, a user is able to enter user-defined descriptor information with respect to the playlist. Unlike current published playlists available in the art, user-defined descriptor information permits a user to creatively enter free-form text, prose, tags or keywords that the user believes describe characteristics of or feelings or moods set by the user-published playlist. For example, present published playlists permit a user to identify a title, genre, and/or artist information for the playlist. This information is not entirely useful to a third party seeking to find a playlist for a specific purpose, environment, mood, concept, or task, for example. User-defined descriptor information of the present disclosure, as used herein, refers to any type of user-provided text, prose, tags, keywords and/or descriptors describing a user's understanding, perception and/or feelings toward, or the mood set by, a playlist, as opposed to the less descriptive associated metadata namely playlist title, or artist, genre, or media file title, which are static and while factual may not satisfactorily provide sufficient characteristic information. One exemplary embodiment of a user interface capable of receiving user-defined descriptor information is depicted in FIG. 2. Referring to FIG. 2, the user interface comprises a text field box 205 in which a user can enter user-defined descriptor information. In one embodiment, the user-defined descriptor information may comprise a playlist description as entered by the user. Then, by selecting a user input indicia, such as a button 230, the user can save the user-defined playlist information along with the playlist. For example, FIG. 5 depicts a text description box 205 comprising user-defined descriptor information. In FIG. 5, the playlist description box 205 includes the user-defined descriptor information "playlist for while at work. Not ideal for working out." In one embodiment, each time the playlist is accessed, the user-defined descriptor information also appears along with the playlist. In further embodiments, the user can edit the user-defined descriptor information as many times as the user desires. In another embodiment, the user-defined playlist information entered into the descriptive field box 205 is indexed or serialized along with the playlist information into a storable playlist entry as described in further detail herein.

Referring back to FIG. 1 once the playlist is created 105, a playlist entry is created, 110. In one embodiment, the playlist entry is created 105 by serializing the playlist information and user-defined descriptor information into a searchable playlist entry format. In one embodiment, playlist associated metadata may comprise metadata about the playlist itself such as the playlist name, date created, the duration of the playlist etc. Further, the playlist associated metadata may comprise metadata about each media file within the playlist such as the title of the media file, artist, and album, length, date of creation, and/or rating. In one embodiment, the searchable playlist entry format may comprise a series of searchable fields. For instance, an xml file or XSPF file structure. For example, XSPF standard comprises elements or fields such as title, annotation or comment, identity of the creator, info such as a uri or url, canonical ID, image associated with the playlist, creation date, any licensing term, etc. Thus, in one embodiment, when a playlist is created 105, the playlist information and user-defined descriptor information is serialized into a searchable format.

Figure 4:
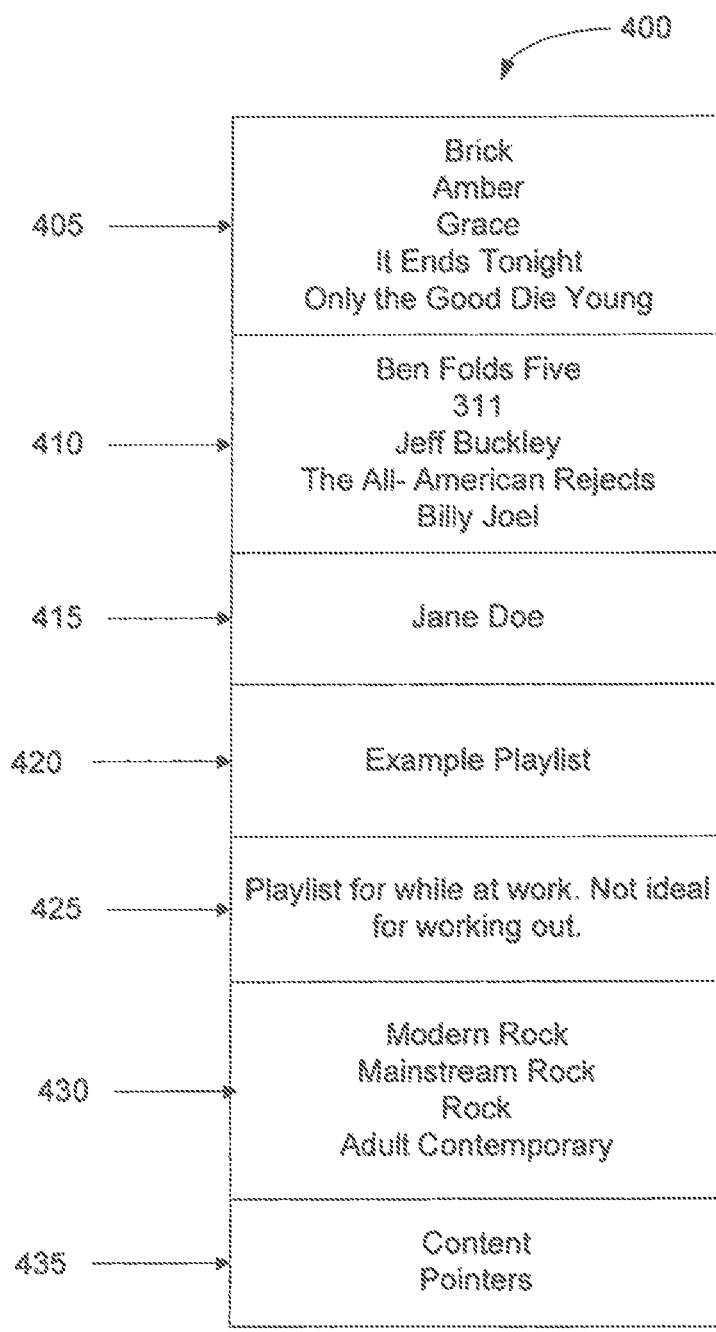
FIG. 4 is a schematic representing a playlist entry according to an exemplary embodiment.

FIG. 4 depicts an exemplary playlist entry 400 derived from a playlist as depicted in FIG. 5. Referring to FIG. 5, the exemplary playlist 505 entitled "Example Playlist" comprises five media files each listed by song title 510, artist name 515, an indicator 520 of whether the playlist is burnable to a cd or not, the genre 525 associated with the media file, the duration 530 of the particular media file, and a rating 535 associated with a media file. For example, the first media file 540 in the playlist 505 is entitled "Brick," by the artist "Ben Folds Five" which has duration of four minutes and forty-eight seconds. Further, as can be seen in the user interface, the media file 540 is not burnable and is in the Modern Rock genre. Additionally, the playlist description text box 505 has been entered with user-defined descriptor information 505 corresponding to the playlist. Accordingly, the playlist entry corresponding to the playlist 505 can comprise some, all, or none of the information displayed in the user interface. Of course other, non-displayed information associated with the media files within the playlist may comprise the playlist entry.

Accordingly, FIG. 4 depicts an exemplary playlist entry corresponding to the playlist as depicted FIG. 5. As can be seen in FIG. 4, the exemplary playlist entry 400 comprises several fields 405-435. As depicted in FIG. 4, one field 405 comprises a listing of all the titles associated with the media files in the playlist. As seen, field 405 lists: Brick, Amber, Grace, It Ends Tonight, and Only the Good Die Young. Accordingly, with reference to FIG. 5, these are the same titles associated with the media files of the playlist 505. Similarly, another field 410 comprises a listing of all the artists associated with the media files in the playlist. As seen, field 405 lists: Ben Folds, 311, Jeff Buckley, All-American Rejects, and Billy Joel. Accordingly, with reference to FIG. 5, these are the same artists associated with the media files of the playlist 505. Further, field 420 lists the name of the playlist creator, field 420 lists the name of the playlist, and field 430 lists the genre associated with each media file in the playlist. In further embodiments, the playlist entry comprises a field 425 comprising strings of text representing the user-defined descriptor information into the field description box 205 as depicted in FIG. 5. For example, referring to FIG. 5, the text field description box 205 contains the user-defined playlist information: "Playlist for while at work" and "Not ideal for working out." As described herein, in one embodiment, the playlist application is capable of serializing the user-defined descriptor information entered into the box into a useful field of the playlist entry. In one embodiment, the field 425 may comprise some or all of the text entered into the text field description box 205. Further, all methods known to those skilled in the art of serializing text into a searchable field are contemplated. Thus, the playlist is searchable by user-defined descriptor information. As can be seen in FIG. 4, field 425 comprises the text strings "Playlist for while at work" and "Not ideal for working out." Further depicted in FIG. 4, a field entry 435 may comprise pointers to the contents of the playlist and/or physically include the contents of the playlist. In a further embodiment a playlist field entry may comprise a playlist id assigned and recognized among an online media service. Accordingly, in one embodiment, a user or entity is capable of searching the contents of the playlist entry. Thus, the user-defined descriptor information can be used to further enhance indexing and searching capabilities. It is noted that not all of the fields in the playlist entry may be capable of searching. In further embodiments, it may be desirable to indicate which types of fields are not preferred for searching such as the member's user name or profile name. Again, in one embodiment, the playlist entry can comprise any combination of field entries gathered from different sources. Thus, in one embodiment, the categorical aggregation of fields into a useful playlist entry allows for efficient playlist searching capabilities.

Referring back to FIG. 1, once the playlist is created 105 and the playlist entry is created 110, the playlist entry is stored 115 in a playlist index and stored 120 in a playlist storage. In one embodiment, with reference to FIG. 3, the playlist storage 345 stores the playlist entries. Thus, the playlist storage contains all playlist information. In one embodiment, the playlist index 375 stores a subset of the playlist entries stored in the playlist storage 355 so that the processor 300 and/or other programs and servers 370 can easily and efficiently access the stored playlist entries.

Turning back to FIG. 1, in one embodiment, the user can elect to publish 125 a playlist. In one embodiment, when the playlist is selected as published 125, the playlist entry is updated within the playlist index 130 and within the playlist storage 135. Similarly, when a public playlist is elected to become private (not depicted), the playlist entry is updated within the playlist index 130 and within the playlist storage 135. In one embodiment, the playlist index 130 and/or playlist storage 135 are not updated simultaneously upon publication or privatization. Instead, the playlist index 130 and/or playlist storage 135 are updated upon a pre-determined time interval. In one embodiment, only public playlists are stored in the playlist index. Thus, by accessing the playlist index for searching a playlist, only published playlists are searchable.

Accordingly, in one embodiment, a user's playlist is by default considered private. Thus, a user must affirmatively choose to make a playlist public. In one embodiment, a user may choose to publish their playlist, for example, by clicking on a user input indicia such as a button or link. The user is preferably given the option of making the published playlist public, thus allowing other users to not only view the playlist but to listen to media listed in the playlist as well. In one embodiment, the published playlist can contain pointers that identify the network location(s) at which the media file resides or may be accessed (a pointer may comprise a URL or URI), metadata or actual media files, although preferably the playlist contains pointers to avoid the need to store multiple copies of the same media file on the network. Thus, a playlist can be made available to a user at any location by publishing the playlist. Thus, the ability to publish a playlist has the added benefit of making the playlist completely portable by being available to all users, as it will be residing on the media server or other user accessible location(s) on the network.

For example, referring to FIG. 2, through an exemplary user interface, the user is able to select the public feature 210 that publishes the playlist. In one embodiment, selecting the public feature 210 causes a visual indictor to appear or highlighting or any other way of emphasizing and indicating that a particular playlist is public. For example, in FIG. 2, the text of the public feature 210 "Make it public" becomes darken and bolded upon selection. Further, the user can select the private 235 feature at any point to remove the playlist from the public. Similar to selecting the public feature 210, selecting the private feature may cause a visual indictor to appear or highlighting or any other way of emphasizing and indicating that a particular playlist is private. Further, as depicted in FIG. 2, a user can also email 220 a playlist, send 215 the playlist via an instant messaging application, or copy 225 the playlist as a url to share with other users, for example by posting it on a blog or website. In a further embodiment, once a playlist is selected as public, it is published on a profile page which may or may not be incorporated into a media management program as described in further detail herein.

In one embodiment, the playlists are searchable through a user interface as depicted in FIG. 5. As can be seen in FIG. 5, the user interface comprises an area 560 for searching for playlists. In one exemplary embodiment, the area for searching 560 for playlists comprises a drop down menu 545 and a text field box 550. As can been seen in FIG. 5, the user can select the "playlist" choice from the drop down menu 545, enter any search criteria into the text field box 550, and select search indicia such as a button 555 to trigger a search for at least one playlist associated with the search criteria. In one embodiment, the playlist program 345 as depicted in FIG. 3 can receive input criteria from a user 330 or other programs and services 370, reference the playlist entries and retrieve and return the appropriate results back to the user's processor 300 and/or other programs and servers 370. In one embodiment, the processor 300 and/or other programs and servers 370 can directly search the playlist index without use of the playlist program. In one embodiment, referring to FIG. 3, when a search input for a playlist is received from the processor 300 and/or other programs and servers 370, it queries the playlist index 375 for matching playlists. In one embodiment, some or all of the information contained in a playlist entry is searchable. In other embodiments, playlist entry information may be included in the entry and used for display in the user interface, but may not be searchable. This could include the number of songs or media files in the playlist, the images associated with the songs in the playlist, the date the playlist was created and modified, and the genre names of the songs in the playlist. Of course, any other associated playlist information may be used as a field entry and may or may not be searchable.

In one embodiment, the playlist search results are returned via a user interface which displays the resultant playlists. In one embodiment, the user interface may be incorporated in a media management program. For example, in FIG. 6, a user can search for playlists by choosing the playlist parameter 605 from a drop down menu 545 and entering search criteria 610 into a text field box 550. Then, a user can select a button 555 to trigger a search for playlists associated with the search criteria.

Figure 6:
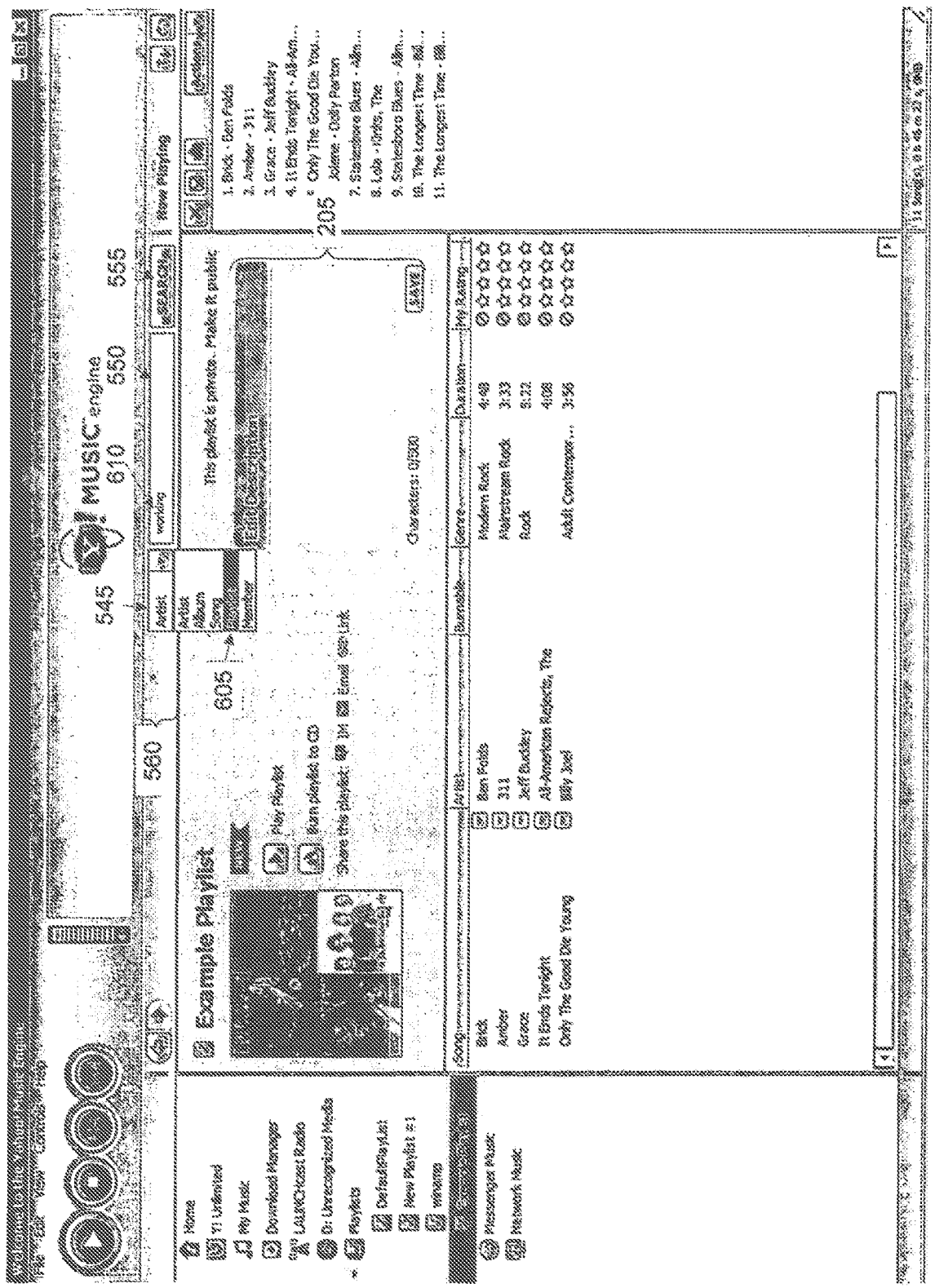
FIG. 6 is an exemplary user interface according to one exemplary embodiment.

In one embodiment, the search criteria are used look for matches against the content of all the playlist field entries. For example, if the search criterion 610 is for the term "working" as depicted in FIG. 6, each playlist entry is referenced looking for the term "working." For example, the term "working" may relate to playlists for a working environment or even return playlists for working out. In any event, the input criterion can search by any string of text representing any portion or entire concept, situation, event, and/or mood. In one embodiment, if any playlist field contains the term, the playlist will be returned to the searching entity. For example, a playlist will be returned if the term "working" is found in the playlist title field, user-defined descriptor information field, artist field, playlist title field, and/or genre field etc. it is important to note that in some embodiments, the playlists storage and playlist index are capable of storing playlist entries from multiple users and multiple sources. Thus, when a playlist search is triggered, a user or entity can search playlists created by any other user or source. Thus, the present disclosure allows users or entities to search for any playlist indexed and stored in the playlist storage and/or playlist index from any creator and from any source.

Figure 9:
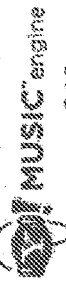
FIG. 9 is an exemplary user interface according to one exemplary embodiment.

An exemplary embodiment of the returned results from a playlist search is depicted in FIG. 9. As can be seen in FIG. 9, in one embodiment, the playlists matching the search criteria are displayed in a scrollable area 905. As depicted in FIG. 9, the results of the playlist search may be displayed in columnar format. In other embodiments, the results of the playlist search may be displayed in table format, in a menu, drop down list or any other suitable way. Further, area 905 comprises a list of each of the matching playlist 910, 915, 920, 925, 930, and 935. In one embodiment, as depicted in FIG. 9, each playlist is numbered 815, listed by title 825, by the member and/or user 945 who created and/or owns the playlist, key artists 830, and number 835 of media files within the playlist. In a further embodiment, as depicted in FIG. 9, a playlist may also have listed a description column 950. In one embodiment, the playlist description 950 column lists an excerpt of terms from the user-defined descriptor information text box associated with each playlist. For example, as shown in FIG. 9, the second returned playlist 915 has descriptive terms such as "easy listening" and "mellow" and the third returned playlist 920 has description terms such as "not for working in groups." Further, in cases where no user-defined descriptor information has been entered and associated with the returned playlist, those returned playlists will not display a description. For example, the first returned playlist 910 has a blank space in the description column 950. In other embodiments, the description column 950 may comprise a URL, uri, or a pointer that directs a user to the full user-defined descriptor information. In other embodiments, simply toggling over the terms in the description column 950 will cause the full description to appear as an enlarged text box.

In a further embodiment, a user can filter the returned playlist results. For example, as depicted in FIG. 9, a drop down menu 940 filters the displayed results by displaying all of the results or some select portion of the displayed playlists. For example, the playlist results may be filtered according to popularity, recency, the identity of the associated members to show only friends' playlists, by usage rights (for example, to display playlists with only subscription content), and/or any identifiable associated playlist attribute such as artist, album or genre. In other embodiments, the filter parameters may be set through a variety of presets or through a preference menu. For example, a preset could be selected for only displaying returned playlists that have the artist matching the search criteria. Of course, many combinations and variations of filter parameters as known to those skilled in the art are contemplated.

In some embodiments, the search criteria used to identify a playlist is highlighted or otherwise emphasized in the user interface. The search term may be highlighted or emphasized using a particular color, a box around the text, via an icon, or any other known method of highlighting or emphasizing text and/or graphics in a user interface. In one aspect, this allows a user to easily view which field or playlist attribute matched the search criteria. For example, referring FIG. 9, since the search criteria 610 was the term "working"; the term is boxed wherever it appears in the returned playlist user interface. As depicted in FIG. 9, the term "working" appears in the description column 950 of the third playlist "80's Music" 920, the fourth playlist 'Working Tunes" 925, and the sixth playlist "High Energy" 935. Meaning, in one embodiment, each of these playlists has associated user-defined descriptor information comprising the term "working." Also, the term is boxed in the title of the fourth playlist "Working Tunes" 925. Thus, in one embodiment, the user interface displays the search term for quick and easy reference.

In other embodiments, instead of highlighting or otherwise emphasizing the search term in the returned playlist display, the display may comprise a column or some type of indicator that indicates where the search term is located with respect to the returned playlist. For example, the indicator or column can indicate that the search term appears in the title of a media file within the playlist, or is a part of the user-defined descriptor information, and so on.

In one embodiment, the returned playlist, results are displayed as media file identifiers such as urls, uris, or pointers that can direct a user to the location of the playlist and/or its contents. Thus, through the user interface as depicted in FIG. 9, a user can select any of the returned playlists and/or the member name to further explore information associated with the playlist and/or member such as viewing and/or playing the playlist.

Figure 10:
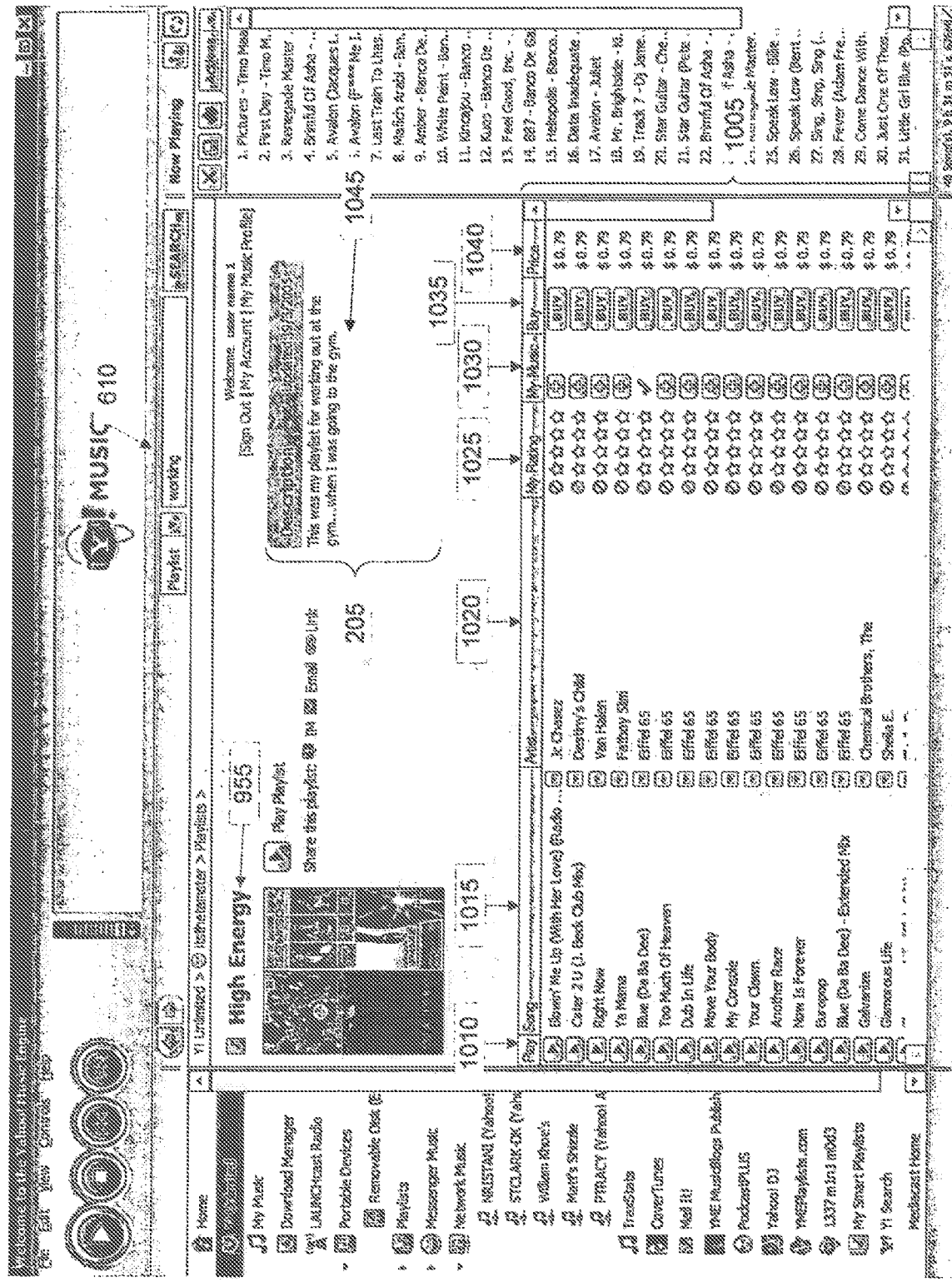
FIG. 10 is an exemplary user interface according to one exemplary embodiment.

FIG. 10 depicts an exemplary user interface if the "High Energy" playlist 935 is selected from the returned playlist user interface depicted in FIG. 9. As can be seen in FIG. 10, the media files of the selected playlist 935 are listed in an area 1005. Area 1005 lists each media file in the playlist 935 by media file title 1015, artist 1020, and rating 1025. In a further embodiment, as depicted in FIG. 10, a button 1030 allowing a user to add the media file to their local media file collection, a button 1010 allowing a user to play the media file, and a button 1035 allowing a user to purchase the media file and its associated price 1040 are also listed next to each media file of the playlist 915. In a further embodiment, as depicted in FIG. 10, a description text box 205 corresponding to the selected playlist is displayed. As depicted in FIG. 10, the description box 205 comprises user defined descriptor information 1045 "This was my playlist for working out at the gym . . . when I was going to the gym." Thus, it can be seen that the search term "working" 610 appears the in the user defined descriptor information 1045 associated with the "High Energy" playlist 935.

In a further embodiment, the playlist program is capable of weighting the fields of a playlist in order to determine which playlists with fields matching the search criteria should be returned to the user or entity. For example, the artist name and media file title fields may be weighted more than the creator name field. Thus, a playlist is more likely to be returned if a search criterion is found in the artist name and/or media file name than if in the creator field. In other embodiments, conditional logic is used to determine whether a particular playlist is returned to a user. In other embodiments, a specific count of occurrences of an input criterion in a playlist entry is required in order for a playlist to be returned to a user. In further embodiments, what playlists are returned is based, in part, on affinity relationships. The playlist program can also use the popularity of a playlist as measured by the amount of time other users spend listening to it to influence relevancy by ranking popular playlists higher than unpopular playlists. Playlist size may also be used as part of relevancy to ensure that users who search get useful playlists returned to them. Of course, many combinations and methods of selecting a playlist using search criteria known to those skilled in the art are contemplated.

Figure 7:
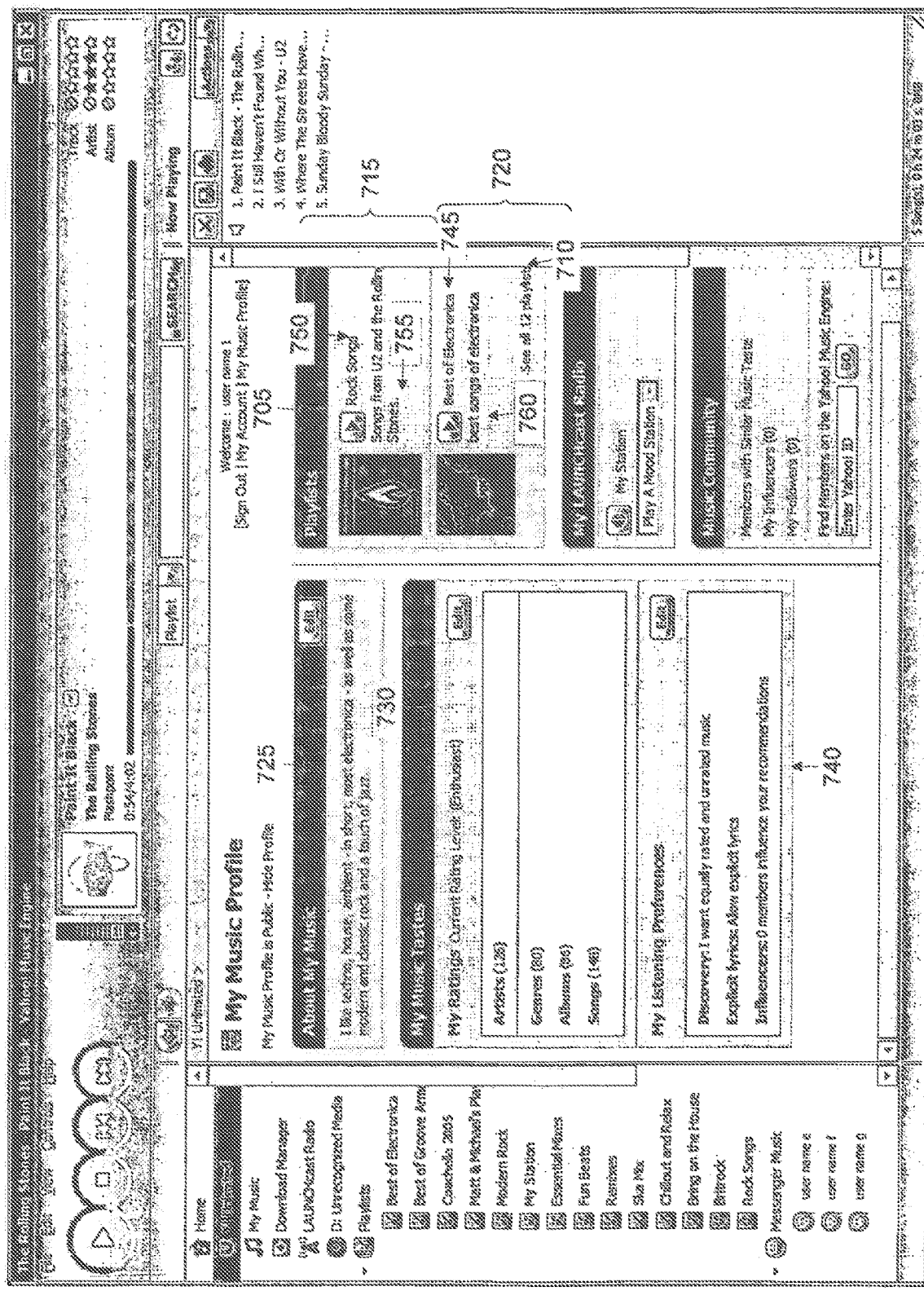
FIG. 7 is an exemplary user interface according to one exemplary embodiment.

In one embodiment, once a playlist is selected to be public, it is published on a profile page of a media management program. In another embodiment, a user's profile page is accessible outside the context of a media management program. Thus, in one embodiment, the profile page is accessible from any authorized internet source. In one aspect, a profile page comprises a page which collects and displays various information about a particular user. In one embodiment, all of a particular user's published playlists may be displayed on the user's profile page, FIG. 7 depicts an exemplary embodiment of a user profile page. As can be seen in FIG. 7, the profile page comprises several areas 705, 725, 730, 740 for displaying various types of information about the user. For example, area 725 displays user-defined text that describes the user's musical interests and/or preferences. Further, area 730 displays users applied media file ratings organized by genre, album, and song, and photos of the user's highest-rated artists. Also, area 740 displays a user's listening preferences. As depicted in FIG. 7, the user can edit each area as desired. In particular, area 705 displays a user's published playlists. As can be seen in area 705, two playlists 715, 720 are listed. The profile page may show the playlist titles 750, 745, along with information such as key artists (not depicted), the number of songs in the playlist (not depicted) and description information 755, 760. This description information 755, 760 may or may not be derived from the playlist's associated user-defined descriptor information. Further, a link 710 is provided so that all of the user's published playlist may be viewed.

Figure 8:
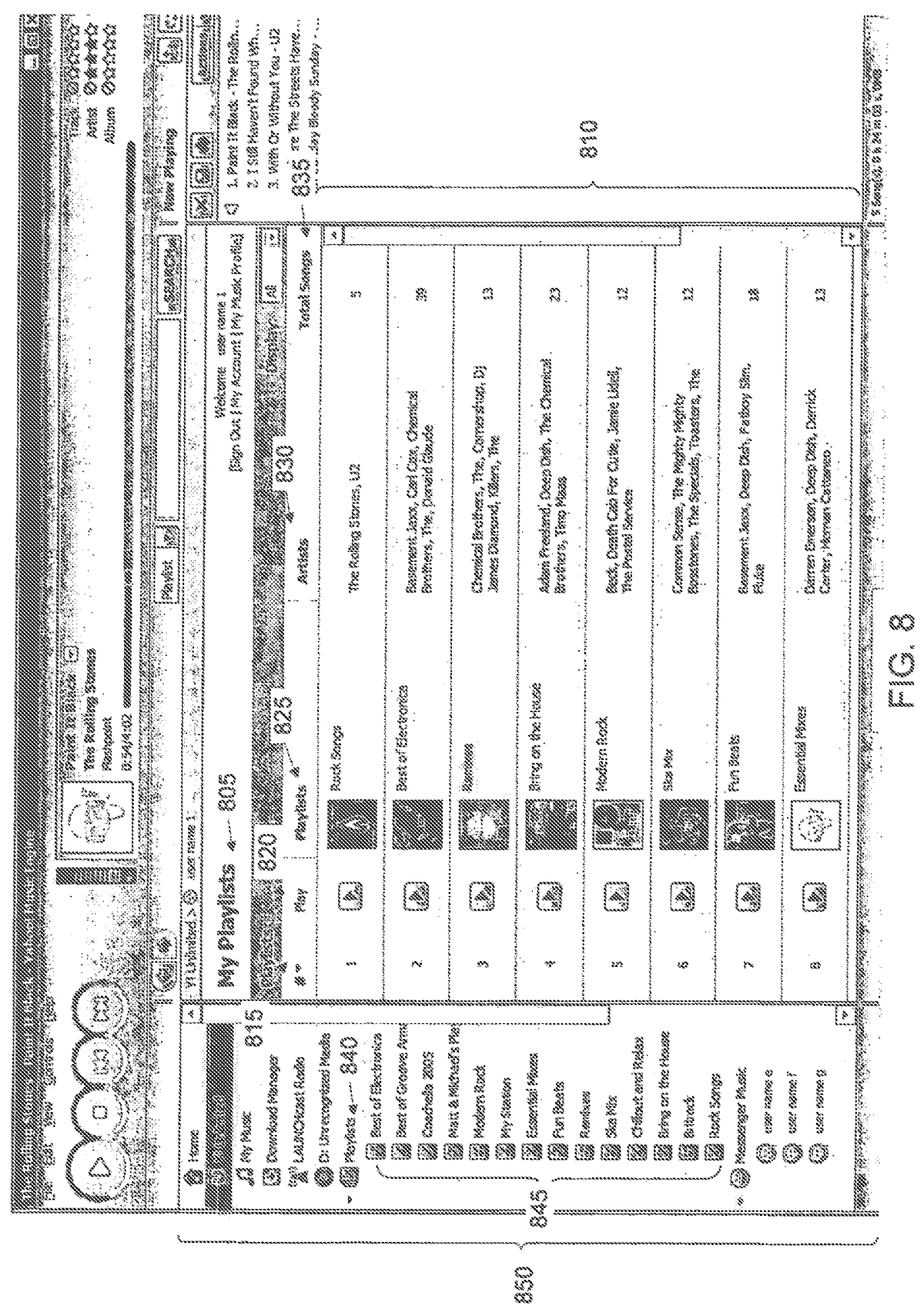

An exemplary embodiment of a user interface displaying all of a user's published playlists is depicted in FIG. 8. As can be seen in FIG. 8, a user's published playlists are displayed in a scrollable area 810 and are listed by number 815, playlist title and a representative playlist image 825, key artists included in the playlist 830, and a number 835 of total media files within the particular playlist. For example, the first playlist displayed is entitled "Rock Songs" which has five total songs and "The Rolling Stones" and "U2" as the key artists. In one embodiment, the key artist 830 represents the more popular artists as defined by a user, an online music community, or via ratings within the particular playlist. In another embodiment, the key artist 830 represents the artists with the highest reoccurrence within the playlist. In a further embodiment, the area 810 may also comprise a column for listing user-defined descriptor information (not depicted). In a further embodiment, as depicted in FIG. 8, a corresponding categorical menu area 850 comprises a playlist selection 840 which can be expanded 845 to show all playlists. Thus, area 850 allows for easy browsing of a user's playlists. In one embodiment, area 850 provides a visual indicator (not depicted) indicating whether a playlist is public or not. In one embodiment, the visual indicator may comprise highlighting the public playlists, adding a particular icon next to each public playlist, or subdividing the expanded menu 845 (not depicted) into public playlist and private playlists.

Further, in one embodiment, selecting the play 820 button next to each playlist will cause the playlist to be loaded and played by a media management program (such as media player like Yahoo! Music Engine or MusicMatch). Through such a media management program, a user can further manage their playlists. In one embodiment, the following variations and features regarding managing and the collaborative playlist is controlled by the media management program. For example, a media management program's user interface may allow the user to stop, rewind, fast-forward, pause, and or/stop the playing of the playlist. In another embodiment, the user can copy the playlist and rearrange and/or delete media files to customize the playlist. It is contemplated that users will also be able to bookmark other users' playlists, enabling them to keep access to a playlist even as the creator of the playlist makes changes to it.

Providing access of a user's published playlist on a profile page allows users to further get to know other member's and browse their musical tastes. Of course any combination and other areas of information are contemplated. In one embodiment, users can control access to their playlists by making an individual playlist public or private, or by making the entire profile page public or private. Of course it is contemplated that access to a user's playlist may be controlled by further detailed designations. For example, a user can designated that all playlists are only publicly available to a designated list of friends, other users, or specific online community such as a messenger community.

In one embodiment, the ability to share and view playlists among different users will be dependent on certain Digital Rights Management (DRM). In one embodiment, the playlists created and viewed by another user will contain sufficient DRM information to ensure that the user viewing the playlist has sufficient rights or a specific permission level to permit the user to experience the media contained in the playlist. In one embodiment, this function is controlled by the media management program.

In one embodiment, the ability of a user viewing and/or playing of another user's published playlist to access a media file and/or media file identifier is governed by a permission level. In one embodiment, the permission level may be triggered upon the user attempting to view the playlist. In another embodiment, the permission level may be triggered when the user attempts to play the playlist. Meaning, that in one embodiment, the user can view all playlists, but permission levels will control whether a user can play the media files within the published playlist. Thus, in one embodiment, the ability to view and/or play a media file and/or media file identifier in a published playlist may be governed by a permission level. In one exemplary embodiment, the permission level is associated with the media file. In another exemplary embodiment, the permission level is controlled by a subscription from a service provider. Rights and permissions can be managed by a DRM application or an associated media management application or media player or combination thereof.

In an exemplary embodiment, the permission level depends on each user's status as a subscriber or a non-subscriber to an on-demand-streaming media service (ODSMS). For example, if the user who has published a playlist is a subscriber and the user desiring to view and/or play the published playlist is also a subscriber, then the desiring user can have full access to each ODSMS media file identifier on the playlist. In another exemplary embodiment, if the user publishing the playlist is a subscriber to an ODSMS and the user desiring to view and/or play the published playlist is a non-subscriber, then the desiring user may have limited access to the ODSMS media files. For example, the desiring user may be limited to a pre-determined length clip of each ODSMS media file, such as a 30-second clip when the desiring user plays the media file. In another example, the desiring user may be given a pre-determined number of times the user can play each ODSMS media file. After this pre-determined number of times has been reached, the user is then limited to a default, pre-determined length of time for each media file (such as a 30-second clip). For example, the non-subscribing, desiring user may be limited to playing an ODSMS media file at its full-length to three times. Thus, once the user had played the media file and/or media file identifier three times, the user can now only listen to 30 second clips of the media file. This allows a non-subscribing desiring user to listen to ODSMS music otherwise not available to the user, while enticing the user to subscribe to the service. Accordingly, in one embodiment, once the user's pre-determined numbers of full-length plays are used, the user is prompted and has the option to subscribe to the ODSMS.

Of course, these embodiments are not limited to ODSMS media files, but can apply to any media files which require a specified level of sharing, viewing, and/or playing access. For example, it could be negotiated that certain media files generally not available for full-length sharing could be shared and played between any status (subscribing or non-subscribing) of users for a pre-determined number of times. For example, if there is a particular artist who wants to promote and/or entice users to listen to their media files, the artist or their representatives can allow a particular media file to be able to be viewed and/or played among any type of users. However, the users are limited to playing the media file to a certain number of times.

In another embodiment, the user can further utilize the collaborative playlist by burning the playlist to a CD or transferring the media files to a portable device. For example, the user can burn the media filed listed in playlist in the media player window to a CD and/or transfer the media files to a portable device by clicking a button and selecting the option from a drop-down menu. In some embodiments, the ability to transfer media files to a portable device or burn media files to a CD may depend on whether the user has specified access to those media files. Particularly, the user may be required to pay for files not located on the user's local media library. For example, the user may be required to pay for files located on an on-demand, streaming media service. Thus, the user may be required to pay a price for each media file before downloading or burning the media files. In another example, the user may be required to be subscriber to a service that allows the user to download and hum media files. In a further embodiment, the user can perform any of the above managing functions in any combination as the user desires using the media management program.

In a further embodiment, as depicted in FIG. 3, other programs or applications and multiple users 370 can access the playlist program 345 and the playlist storage 355 to search for playlists from non-media management applications. For example, other Yahoo! applications such as Yahoo! Search could access the playlists and enable users to create, edit, and share playlists through the Search user interface.

In some embodiments, the playlist entries within the playlist storage 355 and/or playlist index 375 are updated with all of a user's newly created or edited playlists. In one embodiment, it is important to keep the playlist storage and/or playlist index currently updated with all the newly created playlists and any edits made to the existing playlists via a user's local processor. In one embodiment, synchronizing all playlist edits and newly created playlists among each user's local processor and the playlist storage and/or playlist index requires both that each playlist be associated with an easy identifiable id and a technique for noting whether each particular playlist has been synchronized. For example, in one embodiment, once a playlist is created, it is associated with an id. In one embodiment, the id is generated by an online media service. Thus, the playlist is recognizable throughout the service via its associated id. In further embodiments, other online communities or media services may have access to these playlist ids in order to catalogue, identify, and/or otherwise interface with the playlists by their associated id.

In one embodiment, the list of playlists and its associated ids are maintained in a database 380 stored on a user's local processor 300 as depicted in FIG. 3. In one embodiment, the local database communicates with all of the components of the local processor 300 including the media engine 305. Further, in one embodiment, this local database 380 also maintains a status list or status table comprising each playlist, its associated id, and a flag, marker, or other type of identifier indicating whether that playlist has been fully updated with respect to the playlist storage 355 and/or playlist index 375. In one embodiment, the status table comprises only two states, updated and not-updated. In one embodiment, a playlist is considered not-updated if any type of edit has been made to a particular playlist, or a new playlist has been created and the playlist has not been synchronized with the playlist storage 355 and/or playlist index 375. Thus, the local media engine 305 can reference the database's status table to determine whether a particular playlist needs to be synchronized with playlist storage 355 and/or playlist index 375.

Figure 11:
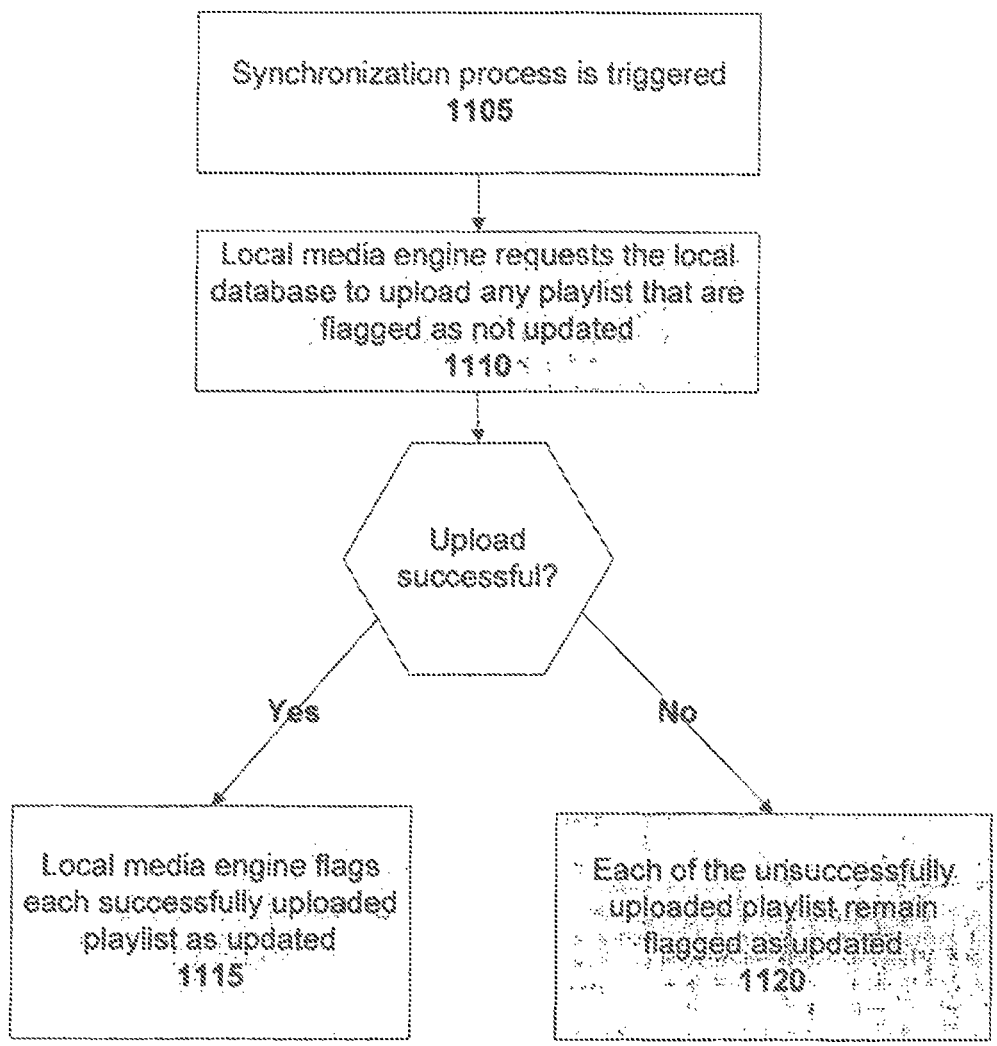
FIG. 11 is an exemplary flowchart illustrating a method according to one exemplary embodiment.

An exemplary synchronization process is depicted in FIG. 11. An exemplary system architecture or configuration supporting the synchronization process of FIG. 11 is depicted in FIG. 3. Referring to FIG. 11, the synchronization process may be triggered 1105 based on a particular time interval such as every 15 minutes or every 30 minutes. In another embodiment, the synchronization process may be triggered 1105 by an event such as starting the playlist application. In yet another embodiment, the synchronization process may be triggered when the user changes any part of a playlist.

Once the process is triggered 1105, with reference to both FIG. 11 and FIG. 3 the local media engine 305 will request the local database 380 to upload to the playlist storage 355 and/or playlist index 375 any playlists that are flagged as not updated. In another embodiment, a playlist is flagged as updated when a user creates a new playlist or when the user modifies an existing playlist. If the upload is successful 1115, the local media engine 305 flags the each successfully uploaded playlists as updated. In one embodiment, if the upload is not successful 1120 or partially successful, each unsuccessfully uploaded playlist will remain flagged as not updated.

Figure 12:
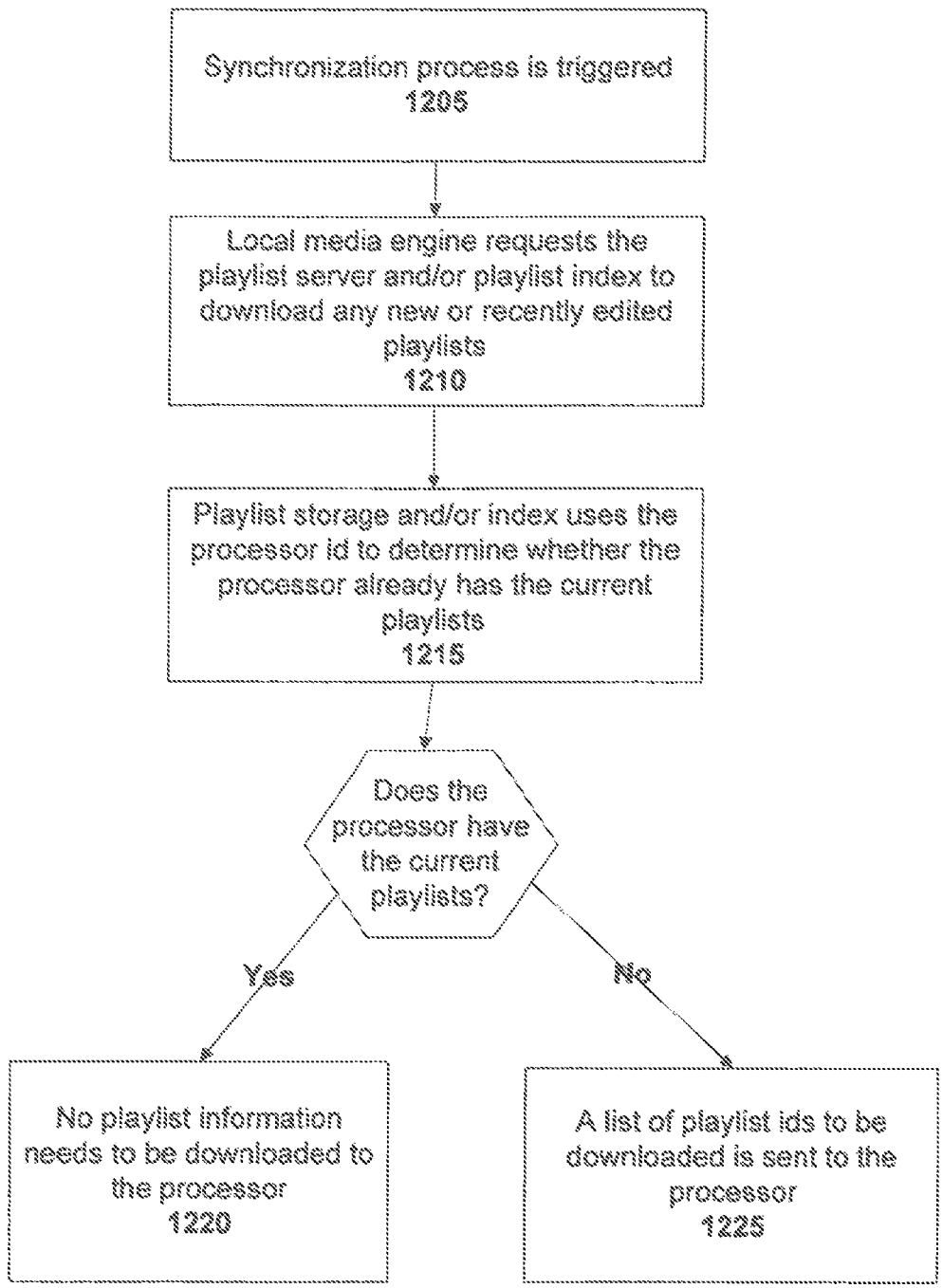
FIG. 12 is an exemplary flowchart illustrating a method according to one exemplary embodiment.

In some embodiments, multiple processors at different locations may be utilized by a single user and/or subscriber to an online media service. An exemplary system configuration comprising multiple processor ids depicted in FIG. 13. As depicted in FIG. 13, the system configuration has the same configuration and functionality as in FIG. 3, however with an additional processor 1300 and user 1330. For example, a user may have a processor at home 300 and a processor 1300 at work and would like to access all updated playlists from each processor 300, 1300. Thus, it is desirable to further synchronize the edited playlists and any new playlists among each of the processors 300, 1300. In one embodiment, media server 360 and/or playlist storage 355 maintains a list of each user's processor wherein each processor is associated with an id. For example, with reference to FIG. 13, processor 300 has an associate id of "ABC" and processor 1300 has an associated id of "DEF" in a further embodiment, this list is maintained on the playlist program 345, and/or playlist index 375. In one embodiment, when a playlist is updated and uploaded to the media server 360 and/or playlist storage 355 as depicted in FIG. 13, the media server 360 and/or playlist storage 355 will note which processor, via processor id, sent the uploaded playlists. Thus, the media server 360 and/or playlist storage 355 will know which processor ids have the uploaded and updated playlists and which processor ids do not have the uploaded and updated playlists. An exemplary synchronization process is depicted in FIG. 12. An exemplary system architecture or configuration supporting such a synchronization process is depicted in FIG. 13. It should be noted that this process applies to any number of processors and the descriptions are merely exemplary with respect to processor 1300. Further the actions performed by the processor 1300 as FIG. 12 and FIG. 13 can also be performed by the media engine 1305. Referring both to FIG. 12 and FIG. 13, first, the synchronization process is triggered 1205. In one embodiment, the process may be trigged by a pre-determined, configurable time interval or by an event such as a user logging onto a processor. Once the process is triggered 1205, the local processor 1300 requests 1210 from the playlist storage 355 to download any newly edited or newly created playlists to the local processor 1300. Further, in one embodiment, this request 1210 may or may not be facilitated by the media server 360 and/or playlist program 345 as depicted in FIG. 13.

Upon the request 1210, the playlist storage 355 and/or playlist index 375 references the requesting processor's 1300 id to determine whether it already has the updated playlists. If the processor 1300 already has the updated playlists, then the playlist storage 355 and/or playlist index 375 will not need to download 1220 any information to the requesting processor 1300. If the processor 1300 does not have all the updated playlists, the playlist storage 355, and/or playlist index 375 sends 1225 a list of the playlist ids to be downloaded to the requesting processor 1300. In addition, when the list of playlist ids is downloaded to the requesting processor 1225, the local processor 1300 flags each downloaded playlist as not-updated. Thus, when appropriate, the local processor will synchronize the appropriate playlists as depicted in FIG. 11 and when successfully downloaded, will flag each playlist as updated.

Playlists are not limited to music files and can include other audio or video files. For example, this system could be used to build playlists of music videos or to develop playable lists of music, audio news, commentary, rrs feeds, podcasts, still images, and video content. In a future application, users could be given tools to syndicate a playlist as an audio or video podcast.

Those skilled in the art will recognize that the method and system of the present disclosure within the application may be implemented in many manners and as such is not to be limited by the foregoing exemplary embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known and features of those variations and modifications through the system component described herein as would be understood by those skilled in the art.

What is claimed is:

1. A method, comprising:
storing a first playlist in a storage medium of an apparatus, wherein the apparatus is associated with a subscriber of a media service provided via a network, and wherein a status of the first playlist indicates that the first playlist is not public;
updating the status of the first playlist to indicate that the first playlist is public in response to receiving an input on the apparatus, wherein the first playlist includes a plurality of identifiers of media files, and wherein the first playlist is available for access to a plurality of devices associated with a plurality of other subscribers of the media service after updating the status of the first playlist to indicate that the first playlist is public;
modifying the first playlist to be a modified playlist;
sending the modified playlist to the network;
receiving a second playlist published by a device of the plurality of devices from the network, wherein the second playlist identifies one or more media files; and
storing the second playlist.

2. The method of claim 1, wherein a second status of the second playlist indicates that the second playlist is public.

3. The method of claim 1, wherein the first playlist is sent to a storage medium in the network.

4. The method of claim 1, wherein a subscriber profile associated with the subscriber indicates that the first playlist is public.

5. The method of claim 1, wherein the plurality of devices are associated with designated friends of the subscriber.

6. The method of claim 1, wherein the first playlist is published on a first profile page of the subscriber, wherein the first profile page comprises a title of the first playlist and a link for viewing all published playlists of the subscriber.

7. The method of claim 1, wherein the second playlist is published on a second profile page of another subscriber associated with the device of the plurality of devices, wherein the second profile page comprises a tile of the second playlist and a link for viewing all published playlists of the other subscriber.

8. The method of claim 1, wherein an image associated with a media file and a time that the first playlist is modified are displayed with a title of the first playlist, wherein the media file corresponds to an identifier of the plurality of identifiers.

9. The method of claim 1, wherein the media service is an on-demand-streaming media service (ODSMS).

10. An apparatus, comprising:
a memory storage comprising instructions; and
a processor coupled to the memory storage, wherein the processor is configured to execute the instructions, which cause the apparatus to:
store a first playlist in a storage medium of the apparatus, wherein the apparatus is associated with a subscriber of a media service provided via a network, and wherein a status of the first playlist indicates that the first playlist is not public;
update the status of the first playlist to indicate that the first playlist is public in response to an input received by the apparatus, wherein first the playlist includes a plurality of identifiers of media files, and wherein the first playlist is available for access to a plurality of devices associated with a plurality of other subscribers of the media service after the status of the first playlist is updated to indicate that the first playlist is public;
modify the first playlist to be a modified playlist;
send the modified playlist to the network;
receive a second playlist published by a device of the plurality of devices from the network, wherein the second playlist identifies one or more media files; and
store the second playlist on the apparatus.

11. The apparatus of claim 10, wherein a second status of the second playlist indicates that the second playlist is public.

12. The apparatus of claim 10, wherein a subscriber's profile associated with the subscriber indicates that the first playlist is public.

13. The apparatus of claim 10, wherein the plurality of devices are associated with designated friends of the subscriber.

14. The apparatus of claim 10, wherein the first playlist is published on a first profile page of the subscriber, wherein the first profile page comprises a title of the first playlist and a link for viewing all published playlists of the subscriber.

15. The apparatus of claim 10, wherein the second playlist is published on a second profile page of another subscriber associated with the device of the plurality of devices, wherein the second profile page comprises a tile of the second playlist and a link for viewing all published playlists of the other subscriber.

16. The apparatus of claim 10, wherein an image associated with a media file and a time that the first playlist is modified are displayed with a title of the first playlist, wherein the media file corresponds to an identifier of the plurality of identifiers.

17. A computer program product comprising computer-executable instructions for storage on a non-transitory computer-readable medium that, when executed by a processor, cause an apparatus to:
store a first playlist in a storage medium of the apparatus, wherein the apparatus is associated with a subscriber of a media service provided via a network, and wherein a status of the first playlist indicates that the first playlist is not public;
update the status of the first playlist to indicate that the first playlist is public in response to an input received by the apparatus, wherein the first playlist includes a plurality of identifiers of media files, and wherein the first playlist is available for access to a plurality of devices associated with a plurality of other subscribers of the media service after the status of the first playlist is updated to indicate that the first playlist is public;
modify the first playlist to be a modified playlist;
send the modified playlist to the network;
receive a second playlist published by a device of the plurality of devices from the network, wherein the second playlist identifies one or more media files; and
store the second playlist on the apparatus.

18. The computer program product of claim 17, wherein the first playlist is published on a first profile page of the subscriber, wherein the first profile page comprises a title of the first playlist and a link for viewing all published playlists of the subscriber.

19. The computer program product of claim 17, wherein the second playlist is published on a second profile page of another subscriber associated with the device of the plurality of devices, wherein the second profile page comprises a tile of the second playlist and a link for viewing all published playlists of the other subscriber.

20. The computer program product of claim 17, wherein an image associated with a media file and a time that the first playlist is modified are displayed with a title of the first playlist, wherein the media file corresponds to an identifier of the plurality of identifiers.

* * * * *